United States Patent
Long et al.

(10) Patent No.: US 12,436,819 B2
(45) Date of Patent: Oct. 7, 2025

(54) HYBRID CLOUD-EDGE COMPUTING ARCHITECTURE FOR DECENTRALIZED COMPUTING PLATFORM

(71) Applicant: Theta Labs, Inc., San Jose, CA (US)

(72) Inventors: Jieyi Long, Santa Clara, CA (US); Mitchell C. Liu, Los Altos, CA (US)

(73) Assignee: Theta Labs, Inc., San Jose, CA (US)

( * ) Notice: Subject to any disclaimer, the term of this patent is extended or adjusted under 35 U.S.C. 154(b) by 80 days.

(21) Appl. No.: 18/633,570

(22) Filed: Apr. 12, 2024

(65) Prior Publication Data

US 2025/0123902 A1  Apr. 17, 2025

Related U.S. Application Data

(60) Provisional application No. 63/590,451, filed on Oct. 15, 2023.

(51) Int. Cl.
*G06F 9/50* (2006.01)
*G06F 9/48* (2006.01)
*H04L 9/32* (2006.01)

(52) U.S. Cl.
CPC .......... *G06F 9/5083* (2013.01); *G06F 9/4881* (2013.01); *H04L 9/3218* (2013.01)

(58) Field of Classification Search
CPC ..... G06F 9/5083; G06F 9/4881; H04L 9/3218
See application file for complete search history.

(56) References Cited

U.S. PATENT DOCUMENTS 10,649,824 B1 * 5/2020 Tan .................... G06F 9/542
11,706,158 B2   7/2023 Bernat et al.

(Continued)

FOREIGN PATENT DOCUMENTS

CN  115967719 A  4/2023

OTHER PUBLICATIONS

Azad et al. "Cledge: A hybrid cloud-edge computing framework over information centric networking". In 2021 IEEE 46th Conference on Local Computer Networks (LCN), pp. 589-596. (Year: 2021).*

(Continued)

*Primary Examiner* — Bing Zhao
*Assistant Examiner* — Willy W Huaracha
(74) *Attorney, Agent, or Firm* — American Patent Agency PC; Daniar Hussain; Stephen M. Hou

(57) ABSTRACT

Disclosed are systems and methods for a hybrid cloud-edge computing platform using decentralized networks for solving resource-intensive computation tasks such as machine learning and video processing tasks. In some respects, the cloud-edge computing platform comprises a coordinator cluster and worker nodes partitioned into shards, which include cloud-based networks and edge networks, and which cater to a wide range of computation requirements. The coordinator cluster manages workloads by selecting the appropriate shard and worker nodes to execute tasks based on computed efficiency scores. Worker nodes may be incentivized with rewards such as cryptocurrency tokens for successful completion of tasks. The disclosed architecture also supports the pipelining of multiple tasks in a workload, where the output of one task is used as input for another task. In some respects, the computing architecture includes a blockchain-supported edge network, which enables verifying compute tasks and managing reward distribution for worker nodes using smart contracts.

16 Claims, 24 Drawing Sheets

(56) References Cited

U.S. PATENT DOCUMENTS

| | | | |
|---|---|---|---|
| 11,811,862 B1* | 11/2023 | Ezrielev | H04L 67/1008 |
| 2013/0254139 A1* | 9/2013 | Lei | G06N 5/02 |
| | | | 706/11 |
| 2020/0153752 A1 | 5/2020 | Chan et al. | |
| 2020/0287941 A1* | 9/2020 | Venkateswaran | H04L 45/64 |
| 2020/0379805 A1 | 12/2020 | Porter et al. | |
| 2022/0156776 A1* | 5/2022 | Long | G06Q 30/0215 |
| 2022/0164240 A1* | 5/2022 | Kim | G06F 9/5027 |
| 2022/0245903 A1 | 8/2022 | Saxena et al. | |
| 2022/0400085 A1* | 12/2022 | Ananthanarayanan | |
| | | | G06F 9/505 |
| 2022/0414432 A1 | 12/2022 | Banitalebi Dehkordi et al. | |
| 2024/0135229 A1* | 4/2024 | Bandyopadhyay | G06N 20/00 |

OTHER PUBLICATIONS

Alsurdeh et al. "Hybrid workflow scheduling on edge cloud computing systems" IEEE Access, 9, pp. 134783-134799. (Year: 2021).*
Jieyi Long and Mitchell C. Liu, "Model Pipeline for Video-to-Text Applications", Google Cloud Next Conference, San Francisco, Aug. 31, 2023, 11 pages, Theta Network, United States.
Jieyi Long, "Nakamoto Consensus with Verifiable Delay Puzzle", Jul. 2021, pp. 20, San Jose, CA, USA.
Long et al., "Scalable BFT Consensus Mechanism Through Aggregated Signature Gossip", The IEEE International Conference on Blockchain and Cryptocurrency (ICBC), 2019, pp. 360-367, San Jose, CA, USA.

* cited by examiner

Create New Deployment

Name
Stable-Diffusion test

Source
Docker | modelzai/gradio-stable-diffusion-23.03 — 1810 AI model/ containerized task Replicas Range
Minimum - 0 +    Maximum - 3 +

| CPU | RAM | Disk Size | GPU Model | GPU Count |
|---|---|---|---|---|
| | | | Nvidia A100 | 4 |

— 1820 GPU selection

Framework
● Gradio Prototype / Demo
○ Mosec Online Interface

Create Deployment
Cancel

FIG. 18

HYBRID CLOUD-EDGE COMPUTING ARCHITECTURE FOR DECENTRALIZED COMPUTING PLATFORM

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

This application is also related to U.S. Ser. No. 16/726,148, filed on Dec. 23, 2019, entitled "Methods and Systems for Micropayment Support to Blockchain Incentivized, Decentralized Data Streaming and Delivery", and U.S. Ser. No. 16/751,772, filed on Jan. 24, 2020, entitled "Methods and Systems for a Decentralized Data Streaming and Delivery Network", each of which is itself a non-provisional of and claims the benefit of priority to provisional application U.S. Ser. No. 62/880,682, filed on Jul. 31, 2019, entitled "Methods and Systems for Micropayment Support to Blockchain-Incentivized, Decentralized Video Streaming and Delivery" and is also a non-provisional of and claims the benefit of priority to provisional application U.S. Ser. No. 62/914,176, filed on Oct. 11, 2019, entitled "Methods and Systems for a Decentralized Data Streaming and Delivery Network" the entire disclosures of all of which are hereby incorporated by reference in their entireties herein.

This application is also related to U.S. Pat. No. 11,763,332, filed on Apr. 30, 2021, and entitled "Edge Computing Platform Supported by Smart Contract Enabled Blockchain Network", and to U.S. Pat. No. 11,611,615, filed on Nov. 16, 2022, and entitled "Decentralized Edge Storage Network with Flexible File Sharding", the entire disclosures of which are hereby incorporated by reference in their entireties herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of cloud computing and distributed edge computing, and pertain particularly to methods and systems for hybrid cloud-edge computing architectures.

BACKGROUND OF THE INVENTION

The statements in this section may serve as a background to help understand the invention and its application and uses, but do not constitute prior art.

The amount of video content and related data continues to grow due to the increasing popularity of social media platforms and rising Internet connectivity particularly in less developed regions. Increasing video data traffic globally is also driven by demand for higher resolution 4K, 8K and higher resolution videos. According to Fortune Business Insights3 the global video streaming market size was valued at about USD $450 billion in 2022 and is projected to grow more than four-fold to over about USD $2 trillion by 2030. This trend drives an increasing need for video encoding, transcoding and delivery services, as well as global visualization and 3D rendering services for various industries including manufacturing, healthcare, construction, education and real estate sectors.

The market for artificial intelligence is expected to grow over 10×in the next decade, driven by adoption of AI applications across verticals from travel to manufacturing. Everything from supply chains, marketing, product making, research, analysis and more are fields that will adopt some aspect of AI within their business structures. The release of ChatGPT in the generative AI market in 2022 was a significant catalyst for end-user adoption of AI and chatbots. The overall AI market is estimated to grow from about USD $140 billion in 2022 to over about USD $2 trillion by 2030 according to market research. This trend drives the need for CPU and particularly GPU compute resources to prototype, train, fine tune and serve AI models.

New "bite-sized" infrastructure compute services to support video, media and general AI computation tasks have become increasingly more important as computation data grows exponentially by 10-100×. For example, to fine-tune and train domain specific large language models (LLM) and generative text-to-image and particularly text-to-video AI now requires large amounts of data which makes today's centralized systems cost prohibitive.

The ability to "paginate" or distribute the workload of vector databases, for example, that store data in a multi-dimensional space with each dimension corresponding to a specific feature or attribute, is groundbreaking. Vector databases are ideal for similarity search applications like natural language processing, computer vision and recommendation systems. They complement generative AI models well, and provide an external knowledge base for generative AI chatbots to ensure information accuracy.

Recent advancements in software and hardware design and manufacturing, as well as developments in faster networking protocols, have enabled the sharing and distribution of many types of resources, including but not limited to, redundant or unused bandwidths, storage, and computation and processing powers. At the same time, there has been an increased need to provide accelerated computation for computational tasks such as the aforementioned video-related services and artificial intelligence and machine learning tasks. In some aspects, existing computing architectures for evaluating AI models and other computation tasks may not be able to provide data output for workloads within a threshold period of time.

While machine learning has become a popular method for developing AI systems, there are numerous complex AI tasks that can be accomplished without it, all of which have the same need of accelerated data output. Examples include but are not limited to:

Rule-based systems: These systems use a set of predefined rules to make decisions. An example of this is a chess AI that uses a predefined set of strategies to play the game.

Expert systems: These are AI systems that simulate the decision-making ability of a human expert. They are designed to solve complex problems by reasoning through bodies of knowledge, represented mainly as if-then rules.

Genetic algorithms: These are used to find approximate solutions to optimization and search problems. They work by mimicking the process of natural selection, where the fittest individuals are selected for reproduction to produce the offspring of the next generation.

Swarm intelligence: This is a type of AI that is based on the collective behavior of decentralized, self-organized systems. Further, while these methods can be used without machine learning, they can also be combined with machine learning techniques to create more powerful AI systems.

Video and audio processing: Video and audio processing may be done with or without AI algorithms. For example, FFMPEG is a software tool for various computations such as transcoding and editing media files.

Therefore, in view of the aforementioned examples, related fields, and general difficulties in providing sufficient computational resources, there is an unsolved need to provide computing architectures including decentralized platforms that allow fast and secure computation associated with computational workloads.

It is against this background that various embodiments of the present invention were developed.

BRIEF SUMMARY OF THE INVENTION

This summary of the invention is provided for ease of illustration only, and is not intended to limit the scope of the invention.

Methods, systems, and non-transitory computer readable storage mediums for hybrid cloud-edge computing using decentralized networks are described.

According to an aspect of the present disclosure, a non-transitory computer-readable storage medium includes instructions that, when executed by a processor, cause a coordinator cluster of a cloud-edge computing platform to receive a data file associated with a workload. The workload includes a first compute task, and the data file includes a first task metadata for the first compute task. The coordinator cluster selects a first shard in the cloud-edge computing platform based on the first task metadata, where the selected first shard is one of a cloud-based network and an edge-based network on the cloud-edge computing platform. The coordinator cluster then computes a first efficiency score for each of one or more worker nodes in the selected first shard, where the first efficiency score for each worker node depends at least on the first task metadata and one or more characteristics of the worker node. The coordinator cluster selects a first one or more worker nodes in the selected first shard to execute the first compute task based on the first efficiency scores of each of the one or more worker nodes in the selected first shard. The coordinator cluster routes the first compute task and at least a first portion of the data file to the selected first shard and the selected first one or more worker nodes. Upon receiving and verifying a first task solution for the first compute task from the selected first shard and the selected first one or more worker nodes, the coordinator cluster transfers a first reward to the selected first one or more worker nodes upon successful verification of the first task solution.

According to another aspect of the present disclosure, the coordinator cluster may also handle a second compute task with a second task metadata, select a second shard in the cloud-edge computing platform based on the second task metadata, and compute a second efficiency score for each worker node in the selected second shard. The coordinator cluster selects a second one or more worker nodes to execute the second compute task, routes the second compute task, the first task solution, and at least a second portion of the data file to the selected second shard and the selected second one or more worker nodes, and transfers a second reward upon successful verification of a second task solution for the second compute task.

Additionally, in some embodiments, the storage medium may include instructions for scenarios where the selected first shard is in one element of a set comprising a cloud-based network and an edge-based network, and the selected second shard is another element of the set, providing a hybrid approach to task execution.

According to other aspects of the present disclosure, the selected first shard may be an edge-based network comprising a decentralized blockchain-based network, and the coordinator cluster may register the first compute task by invoking a smart contract on a blockchain associated with the edge-based network. The coordinator cluster may invoke the smart contract to transfer the first reward from a reward pool on the blockchain to the selected first one or more worker nodes upon successful verification of the first task solution.

In some embodiments, the first task solution may be encrypted, and a zero-knowledge proof of the first task solution may be provided by the selected first one or more worker nodes. The coordinator cluster may verify the zero-knowledge proof of the first task solution.

In some embodiments, the first reward may be calculated based on factors including a job type, correctness of the first task solution, a first task completion time, and resource usage of the selected first one or more worker nodes.

In some embodiments, the coordinator cluster provides feedback to a user, wherein the feedback comprises at least one of a workload completion status, a cryptocurrency amount associated with the first reward, an owner of the workload, a status of the workload, and an identifier associated with the workload.

In some embodiments, one or more shards in the cloud-edge computing platform are part of a multi-shard architecture comprising at least one of a community shard with edge worker nodes, a managed shard with managed cloud nodes, and a partner shard with partner-hosted cloud nodes.

In some embodiments, the selected first shard comprises a master cluster, and wherein the master cluster orchestrates the first compute task among the selected first one or more worker nodes in the selected first shard.

In some embodiments, the first compute task is a generic containerized compute task.

In other embodiments, the workload comprises an artificial intelligence task.

In yet other embodiments, the workload comprises a video processing task.

In some embodiments, the cloud-edge computing platform comprises a distributed storage component that supports temporal, persistent, and immutable storage use cases.

According to another aspect of the present disclosure, a method for hybrid cloud-edge computing in a cloud-edge computing platform is provided, the method includes: receiving, at a coordinator cluster of the cloud-edge computing platform, a data file associated with a workload, wherein the workload comprises a first compute task, wherein the data file comprises a first task metadata for the first compute task; selecting, by the coordinator cluster, a first shard in the cloud-edge computing platform based on the second task metadata, wherein the selected first shard is one of a cloud-based network and an edge-based network on the cloud-edge computing platform; computing, by the coordinator cluster, for each of one or more worker nodes in the selected first shard, a first efficiency score, wherein the first efficiency score for each of one or more worker nodes depends at least on the first task metadata and one or more characteristics of the worker node; selecting, by the coordinator cluster, a first one or more worker nodes in the selected first shard to execute the first compute task based on the first efficiency scores of each of the one or more worker nodes in the selected first shard; routing, by the coordinator cluster, the first compute task and at least a first portion of the data file associated with the workload to the selected first shard and the selected first one or more worker nodes in the selected first shard; receiving, by the coordinator cluster, a first task solution for the first compute task, from the selected first shard and the selected first one or more worker nodes in the selected first shard; verifying, by the coordinator cluster, the first task solution for the first compute task; and transferring, by the coordinator cluster, a first reward to the selected first one or more worker nodes in the selected first shard upon successful verification of the first task solution.

In some embodiments, the workload comprises a second compute task and the data file comprises a second task metadata for the second compute task, and the method further includes: selecting, by the coordinator cluster, a second shard in the cloud-edge computing platform based on the second task metadata, wherein the selected second shard is one of a cloud-based network and an edge-based network on the cloud-edge computing platform; computing, by the coordinator cluster, for each of one or more worker nodes in the selected second shard, a second efficiency score, wherein the second efficiency score for each of one or more worker nodes depends at least on the second task metadata for the second compute task and one or more characteristics of the worker node; selecting, by the coordinator cluster, a second one or more worker nodes in the selected second shard to execute the second compute task based on the second efficiency scores of each of the one or more worker nodes in the selected second shard; routing, by the coordinator cluster, the second compute task, the first task solution, and at least a second portion of the data file associated with the workload to the selected second shard and the selected second one or more worker nodes in the selected second shard; receiving, by the coordinator cluster, a second task solution for the second compute task, from the selected second shard and the selected second one or more worker nodes in the selected second shard; verifying, by the coordinator cluster, the second task solution for the second compute task; and transferring, by the coordinator cluster, a second reward to the selected second one or more worker nodes in the selected second shard upon successful verification of the second task solution.

In some embodiments, the selected first shard is in one element of a set of a cloud-based network and an edge-based network on the cloud-edge computing platform, and the selected second shard is another element of the set of the cloud-based network and the edge-based network on the cloud-edge computing platform.

In some embodiments, the selected first shard is an edge-based network in the cloud-edge computing platform, wherein the selected first one or more worker nodes in the selected first shard are edge computing nodes in the edge-based network, wherein the edge-based network comprises a decentralized blockchain-based network, the method further includes: registering, by the coordinator cluster, the first compute task by invoking a smart contract on a blockchain associated with the edge-based network; and invoking, by the coordinator cluster, the smart contract to transfer the first reward to the selected first one or more worker nodes in the selected first shard upon successful verification of the first task solution, wherein the selected first reward is from a reward pool on the blockchain.

In some embodiments, the first task solution is encrypted by the selected first one or more worker nodes, wherein a zero-knowledge proof of the first task solution is provided by the selected first one or more worker nodes, and wherein the verifying of the first task solution by the coordinator cluster further comprises verifying the zero-knowledge proof of the first task solution.

In some embodiments, the first reward is calculated by the coordinator cluster based on factors comprising one or more of a job type, a correctness of the first task solution, a first task completion time, and a resource usage of the selected first one or more worker nodes.

In some embodiments, the method further includes providing feedback, by the coordinator cluster, to a user, wherein the feedback comprises at least one of a workload completion status, a cryptocurrency amount associated with the first reward, an owner of the workload, a status of the workload, and an identifier associated with the workload.

Yet other aspects of the present invention include methods, processes, and algorithms comprising the steps described herein, and also include the processes and modes of operation of the systems and servers described herein. Yet other embodiments of the invention include devices, servers, systems, and non-transitory storage media storing executable program code for executing the methods disclosed herein.

Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which:

FIG. 17 shows an example user interface for selecting and deploying artificial intelligence (AI) models on the hybrid cloud-edge platform.

FIG. 18 shows an example user interface for managing a user's AI development pipeline on the hybrid cloud-edge platform.

DETAILED DESCRIPTION OF THE INVENTION

Figure 1:
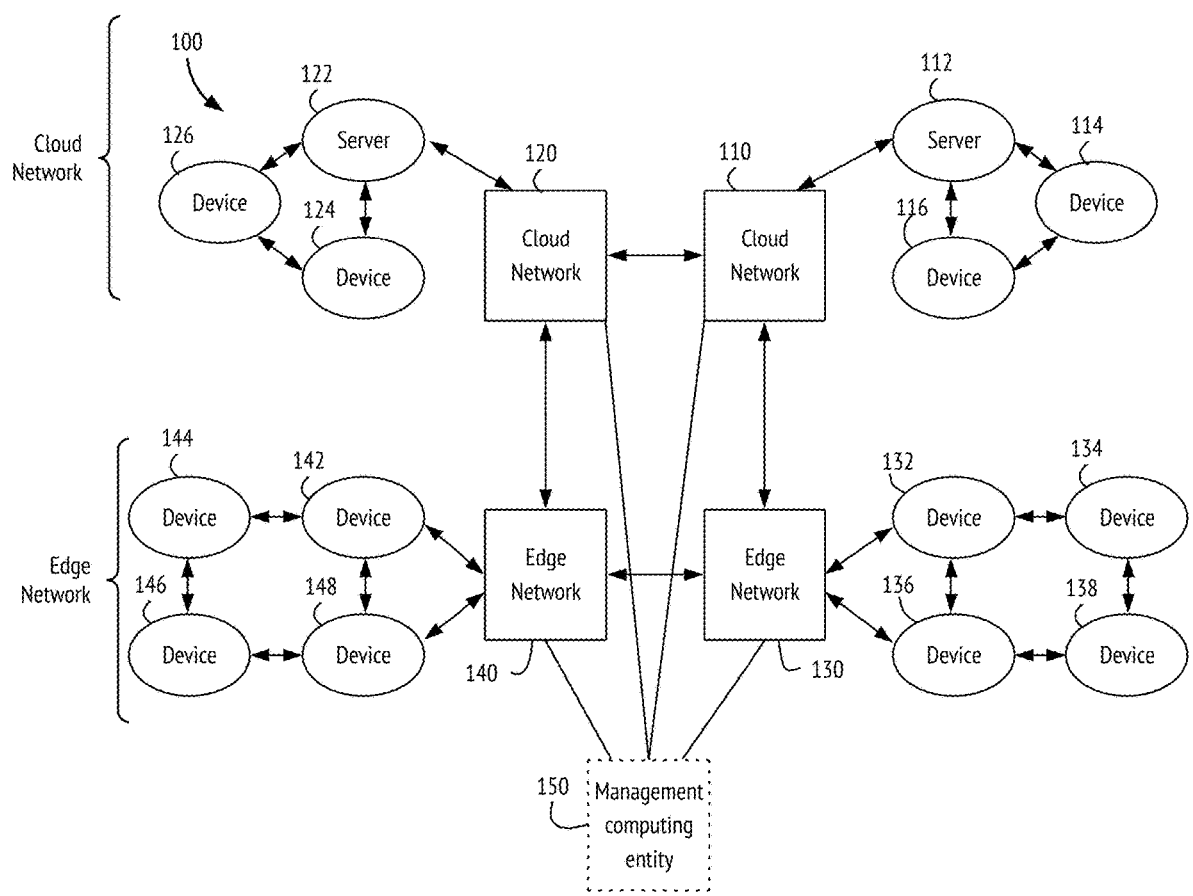
FIG. 1 shows an illustrative example of a hybrid cloud edge network architecture comprising one or more cloud networks and one or more an edge computing network architecture, in accordance with various embodiments of the invention.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

THETA is a trademark name carrying embodiments of the present invention, and hence, the aforementioned trademark name may be interchangeably used in the specification and drawings to refer to the products/services offered by embodiments of the present invention. The term THETA may be used in this specification to describe the overall decentralized computing and storage network or platform, the public ledger system for rewarding computation resource sharing, as well as the company providing said network, platform, system, or services. With reference to the figures, embodiments of the present invention are now described in detail.

Exemplary System Overview

Broadly, the present invention relates to methods and systems for hybrid cloud-edge computing using a cloud network in association with an incentivized and decentralized peer-to-peer edge network for storage, bandwidth, data, and/or computational resource use and sharing.

As noted, there has been an increased need to provide sufficient computational resources for a variety of computational tasks including video, media, and general artificial intelligence (AI) and machine learning (ML) tasks, such as video encoding, transcoding, and delivery, global visualization and 3D rendering services, neural networks, and large language models.

Large enterprises, small and medium businesses (SMBs), and individuals have distinctive computational needs. Large enterprises typically require reliable service with service level agreements (SLAs) such as guaranteed uptime of at least 99.999%. These organizations operate on a massive scale, serving tens or even hundreds of millions of users, and any downtime or performance issues can have significant business consequences. Thus, reliability, robustness, performance, and privacy are the most important considerations and typically overshadow concerns about cost.

In contrast, SMBs, researchers and community-driven projects often strive for a more delicate balance between cost and service levels. They are often constrained by budget limitations, making them inherently cost-sensitive. Reliable services are important, but they may be willing to make calculated trade-offs between price and service levels to maximize their resources. This flexibility allows them to allocate resources efficiently and prioritize aspects that align with their strategic goals.

In some respects, existing computing platforms may not be able to satisfy the computational resource requirements and service level agreements of a diverse range of tasks and users.

While cloud networks can offer stability and high availability, edge networks can have a large number of nodes, each having lower computing capability but collectively having high parallel processing power, and are close to end users (leading to less data movement). In some respects, the disclosed systems can use a cloud-based network and an edge network to obtain a performance that exceeds a threshold being set by any given individual (cloud or edge) network. By using both together, the disclosed systems can implement emerging AI use cases and other computation tasks, such as in video, media, and entertainment.

In some respects, the present technology, herein referred to as a hybrid cloud-edge computing platform, cloud-edge network, or the EdgeCloud platform or the THETA Edge-Cloud platform, or the like, features a fully distributed hybrid cloud-edge computing platform that caters to the diverse needs of a wide range of users. The hybrid cloud-edge computing platform's flexibility addresses the needs of any type of user, customizing its usage to serve large enterprises, SMBs, and community projects alike.

In certain respects, the disclosed systems can feature a pipeline computational architecture and method wherein the data to be processed can be fed into a first computation model (e.g., a first machine learning model) on a first network type (e.g., cloud) and then the output can be fed into a second computation model (e.g., a second machine learning model) on a second network type (e.g., THETA Edge Network). Thus, the disclosed systems can perform computations for a workload using multiple models (e.g., deep-learning models or video processing models) consecutively.

In some embodiments, the disclosed hybrid cloud-edge computing platform supports generic containerized compute tasks, by implementing a virtualization layer where users can run any container on the network. The virtualization layer is designed to execute any user-provided containerized task across a distributed network, thereby enabling the platform to accommodate a diverse array of computational requirements. The virtualization serves as a unified interface that bridges different requirements and caters to a myriad of computing needs, thus delivering a robust, scalable, and adaptable infrastructure. In accordance with the present technology, the EdgeCloud platform is capable of running any computational task that can be containerized. This includes, but is not limited to, tasks associated with complex data analytics, artificial intelligence, video processing, and specialized scientific simulations. The cloud-edge computing platform thus enables users to harness the benefits of containerization, such as isolation, portability, and resource efficiency, and thus optimize, deploy, and scale their computational workloads with enhanced ease and efficiency, taking full advantage of the distributed nature of edge and cloud computing resources provided by the EdgeCloud platform.

Some of the computation tasks and models run on the EdgeCloud platform can include proprietary models accessible through a corresponding application programming interface (API) (e.g., a cloud-based network's API). Some other models can include open-sourced models that can be served by the THETA edge network and can further leverage parallel processing power of the edge network nodes. In some embodiments, each of the edge nodes may implement an end-user software using a THETA Software Development Kit (SDK), so that an edge computing node may utilize pre-existing task solving software or computing environments. That is, the THETA SDK may be integrated into a third-party application or device so that a task may be solved through the third-party application when necessary (e.g., cloud-based applications and/or interfaces having respective application programming interfaces, APIs). The SDK can include a set of software development tools or programming packages for creating applications for a specific platform. An SDK may be compiled as part of the developed application to provide dedicated interfaces and functionalities. Alternatively, an SDK may be an individually compiled module, incorporable into an existing application or computing environment as a plug-in, add-on, or extension in order to add specific features to the application without accessing its source code.

Computing tasks that can be handled by the EdgeCloud platform include but are not limited to those in media and entertainment, artificial intelligence, scientific research, and financial modeling.

Media & Entertainment: In one embodiment of the hybrid cloud-edge computing platform, the decentralized edge network can handle resource-intensive media and entertainment tasks such as video encoding, livestream transcoding, and bandwidth sharing efficiently. The THETA EdgeCloud platform enables computationally demanding tasks including, but not limited to, encoding video content for multiple formats, transcoding to optimize streaming quality, or rendering complex 3D visual effects for movies and animations, by providing the scalability and reliability through a hybrid cloud-edge platform.

Artificial Intelligence: In one embodiment, the present disclosure provides a system for facilitating an artificial intelligence (AI) workflow on a distributed cloud-edge computing platform, such as the EdgeCloud platform. The system is configured to support a multi-stage AI workflow that includes a plurality of computational steps, each step being optimized for execution on the distributed platform. In an exemplary workflow, the system enables data exploration through an interactive computing environment, such as a JUPYTER notebook, where data scientists can analyze and preprocess datasets in preparation for further processing. Following data exploration, the system provides for hyper-parameter tuning and neural architecture search, wherein various configurations of AI models are evaluated to enhance performance characteristics. Subsequently, the cloud-edge computing platform facilitates model training, wherein a chosen deep learning model is trained and adjusted based on input data to improve its performance. The system may further provide for fine-tuning and alignment of the AI model, which includes further adjustments and iterations to improve the model's accuracy to meet predefined criteria. The cloud-edge platform also enables the deployment of AI models, which may occur after model training, fine-tuning, and/or alignment. In the deployment phase, the AI model is utilized to perform real-world applications, such as model serving, inference, generating predictions or generative models. The execution of the various steps of the exemplary workflow may be distributed across the hybrid cloud-edge platform depending on task characteristics.

In some embodiments, the disclosed cloud-edge computing platform runs AI inference applications that include but are not limited to generative text-to-image, text-to-video, large language models (LLM), and other custom models.

The platform enables setting up an infrastructure to make AI model predictions accessible to end-users or other systems through APIs or endpoints. The cloud-edge platform supports the aforementioned AI workflows, which can all be containerized, from data exploration in JUPYTER notebooks to model serving, thus enabling efficient deployment and scalability. In particular, hyperparameter tuning, a process that benefits from parallel processing, is optimized within the system's distributed cloud-edge network. This network architecture allows for the distribution of computational tasks across multiple nodes, enhancing the speed of hyperparameter optimization and reducing the time to identify the best model hyperparameters.

Scientific research: An embodiment of the hybrid cloud-edge computing platform may facilitate complex scientific simulation jobs, including but not limited to, weather forecasting, climate modeling, astrophysics simulations, chemical reactions, molecular structures, and material properties research. These simulations jobs may also include analyzing large genomic datasets, conducting DNA sequencing, and performing complex bioinformatics tasks for genetics research in the biomedical field. These simulations require massive computational resources to model physical, chemical, and biological phenomena accurately. By using a hybrid of edge and cloud resources, the disclosed cloud-edge platform directs simulation tasks to an optimal combination of compute resources to efficiently complete the compute tasks.

Financial Modeling: In the financial sector, complex models are often used for risk analysis, high-frequency trading, and Monte Carlo simulations to assess investment strategies and market behaviors. These applications play a pivotal role in the industry to analyze and optimize investment strategies, market trends, and risk management. The computational demands of these financial models can be substantial, requiring access to high-performance computing resources capable of handling large-scale data and intricate calculations in real-time. In some embodiments, the disclosed EdgeCloud platform satisfies these types of financial computational needs by deploying the tasks over its distributed highly parallel architecture.

Hybrid Cloud-Edge Computing Platform Architecture

FIG. 1 shows an illustrative example of a hybrid cloud edge network architecture comprising one or more cloud networks and one or more edge networks, in accordance with various embodiments of the invention. Edge networks, also referred to as edge computing networks, are distributed computing frameworks consisting of edge nodes, or edge computing nodes. Cloud networks comprise groups of cloud computing nodes which include but are not limited to servers and devices, and which may be hosted on the cloud by various providers.

For example, cloud network 110 can be communicatively coupled to server 112. The server 112 can include many computational devices and/or storage devices, which can execute various computations in accordance with the disclosure. In other aspects, server 112 can be communicatively coupled to devices 114 and/or 116, which can be configured to execute at least a portion of the computations or store data associated with the results of the computations. Cloud network 110 can be communicatively coupled to another cloud network 120, which can also include server 122, in association with device 124 and device 126, similar to the preceding discussion. The cloud networks (for example, cloud network 110 and cloud network 120) can be connected to edge networks (for example edge network 104A and edge network 140). An example edge network 130 can include a decentralized blockchain network (for example, a THETA network) which can include various nodes, generally labeled as devices 132, 134, 136, and 138. Similarly, edge network 130 can be connected to another edge network 140 which can also include the same or a different decentralized blockchain network (for example, a THETA network) which can include various nodes, generally labeled as devices 142, 144, 146, and 148. As described variously herein, the devices shown in diagram 102 can be used to perform various computations partially or in whole. Further shown is a management computing entity 150 which can reside partially or in whole in any of the preceding example blocks, or reside separately from the preceding example blocks, and can be generally used to manage and or otherwise direct the computations, data associated with the computations, the flow of information between networks, the management of workloads, provide user interfaces for interaction with users, combinations thereof and/or the like. The management computing entity 150 may be a coordinator cluster or a coordinator cluster node that manages part or all of the cloud-edge infrastructure by optimally assigning and routing compute tasks. As used herein, any cluster may have one or more nodes.

EdgeCloud Shard Structure

A key design principle of the present invention is dividing edge computing and cloud computing nodes into multiple shards, wherein each shard has its own characteristics that satisfy various SLAs. Thus, each shard may cater to different business requirements. For example, some shards may compute enterprise computation tasks that need to run in a private and secure environment, while other shards are suitable for non-sensitive non-fungible tokens (NFTs), media files, and generative AI tasks that can be executed in a public environment. Other characteristics defining shards include but are not limited to node reliability, robustness, and performance. For example, enterprise customers may have stricter SLAs for their tasks, which may run better on more reliable nodes.

Figure 2:
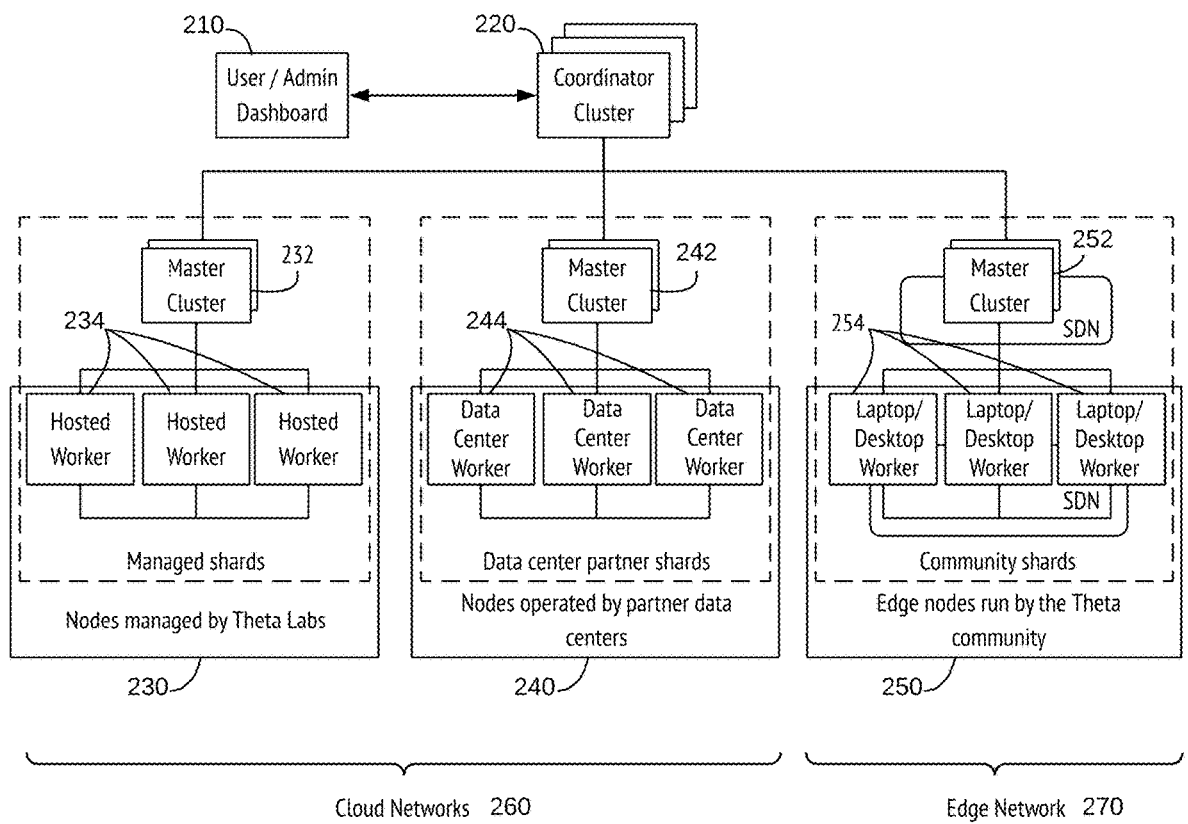
FIG. 2 is an illustrative network diagram showing the hybrid cloud-edge architecture with different shard types and hierarchical shard management structure.

FIG. 2 is an illustrative network diagram showing the hybrid cloud-edge architecture with different shard types and a hierarchical shard management structure. Compute tasks are initiated by EdgeCloud customers and partners through a user-facing dashboard 210 or API for developers. A coordinator cluster 220 oversees and manages the entire cloud-edge infrastructure by optimally assigning tasks to shards and worker nodes in the cloud-edge platform. In one embodiment, the cloud-edge architecture may feature at least three types of shards, each comprising one or more worker nodes and one or more master clusters:

Managed shards 230: Worker nodes 234 of the managed shard type are nodes hosted by THETA EdgeCloud Platform in a cloud environment. In some aspects, worker nodes have the capability to communicate directly with each other through a private network. Managed shards are more reliable and ideal for workloads like AI model training, JUPYTER notebook tasks, and tasks with strict SLA requirements from enterprise customers.

Data center partner shards 240: Worker nodes 244 of the data center partner shard type are nodes run in third party or partner data centers. In some embodiments, the worker nodes in each data center partner shard may communicate directly with each other. In some embodiments, the worker nodes may communicate with the master cluster through public IP addresses. Shards situated in data centers, for example, those managed by entities such as cryptocurrency mining operations and regional cloud service providers, feature enhanced reliability and are usually equipped with superior hardware and software configurations. These characteristics render them suitable for executing workloads with certain SLA requirements.

Community shards 250: Worker nodes 254 of the community shard type are edge nodes which may be community nodes running on personal computing devices such as laptops and desktops, which typically lack public IP addresses. In some embodiments, worker nodes may communicate directly with each other over a software-defined network (SDN). In some embodiments, worker nodes may communicate with each other in a decentralized peer-to-peer (P2P) network, such as the THETA Edge Network, which is further detailed in the section "Edge Computing Network". In some respects, community shards are typically less performant, reliable, and robust than managed shards or data center partner shards. However, they are optimal for smaller, faster, and highly parallelizable jobs, e.g., AI hyperparameter tuning), and tasks like AI inference and video encoding with built-in fault-tolerant mechanisms. In some embodiments, community nodes encompass a wide range of devices including but not limited to smartphones, smart TVs, and distributed Internet-of-Things (IoT) devices.

These shard types may themselves be further divided into sub-types, and each shard type may be composed of one or more shards each consisting of one or more edge or cloud computing nodes. For example, managed shards 230 and data center partner shards 240 are part of the cloud networks 260 of the EdgeCloud Platform, while the community shards 250 in the THETA Edge Network are part of the edge network 270 of the EdgeCloud Platform. Note that clusters and shards may comprise one or more nodes.

As mentioned, the EdgeCloud architecture comprises a coordinator cluster 220, also referred to as a coordinator, which oversees the entire hybrid cloud-edge computing infrastructure and intelligently assigns and routes tasks to the optimal shards and cluster-nodes within shards. Each shard instance may be managed by a master cluster, which manages and carries out orchestration of tasks among worker nodes in the shard. Master cluster 232 in the managed shard 230 orchestrates tasks among the hosted worker nodes 234 in the shard. Master cluster 242 in the data partner center shard 240 orchestrates tasks among the data center worker nodes 244 in the shard. Master cluster 252 in the community shard 250 orchestrates tasks among the edge computing nodes 250 in the shard. The following sections further detail the hierarchical management structure and task assignment processes in the EdgeCloud platform.

EdgeCloud Hierarchical Management Structure

Figure 3:
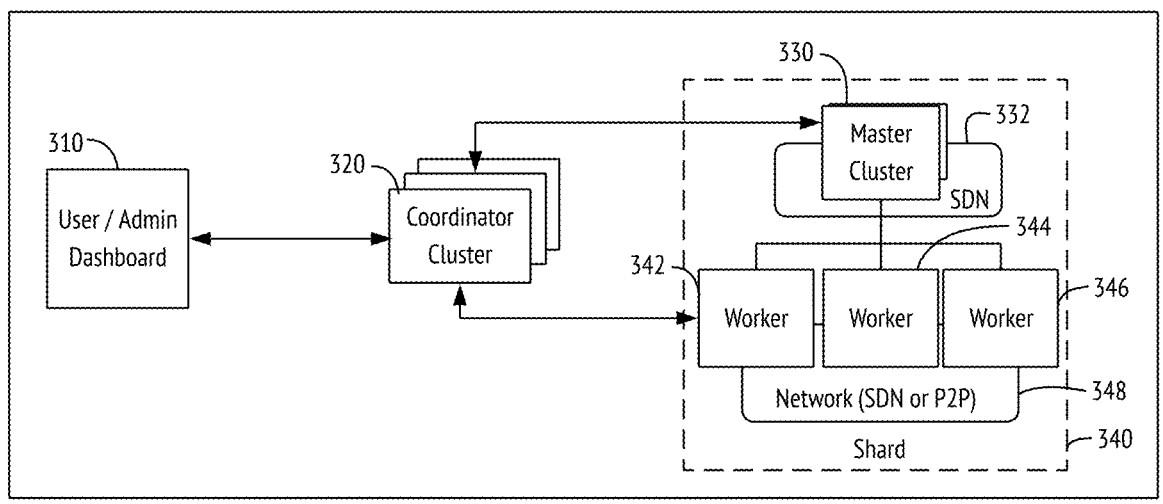
FIG. 3 shows an example diagram of the hierarchical architecture for task assignment in the hybrid cloud-edge computing platform.

FIG. 3 shows an example diagram of the hierarchical architecture for task assignment in the hybrid cloud-edge computing platform. To effectively coordinate tasks among the one or more shards and worker nodes within the shards, a hierarchical worker node management approach is implemented.

A coordinator cluster 320 oversees and manages the entire cloud-edge infrastructure, allowing for infinite scalability and fault tolerance. The coordinator cluster may be a device, server, cluster node, or a cluster of nodes.

Compute tasks are initiated by EdgeCloud customers and partners through a user-facing dashboard 310 or API for developers. The task metadata is passed to the coordinator cluster 320, which then determines which shard and worker nodes the task should be assigned to, using efficiency scores calculated for each worker node across the EdgeCloud network, as will be detailed in the following section.

Coordinator cluster 320 intelligently assigns and routes compute tasks to the optimal shard 340 and one or more worker nodes 342, 344, and 346 within the shard. For clarity, only one selected shard is shown in FIG. 3 but in general a coordinator cluster manages one or more shards in the EdgeCloud architecture as illustrated in FIG. 2.

Within each shard 340, a master cluster 330 manages and orchestrates that shard's operations, comprising an orchestration control plane providing an API server, scheduler, and other control components. In some embodiments, the master cluster 330 may implement multiple master nodes to ensure fault tolerance by the redundancy.

Further, within each shard 330, one or more worker nodes 342, 344, and 346 execute compute tasks. Worker nodes 342, 344, and 346 may communicate with each other on a network 348 such as a software-defined network (SDN) or a peer-to-peer network such as the THETA Edge Network, and with the master cluster on a network 332 which may be a SDN or a peer-to-peer network. The worker nodes 342, 344, and 346 may run THETA edge node client software. Across all shards, worker nodes maintain a consistent software environment, though they may vary in their hardware specifications and performance capabilities. For example, worker nodes in community shards may typically be composed of lower and mid-tier CPUs and GPUs on laptops, PCs, smartphones, mobile devices, and other IoT devices. In contrast, managed shards or data center partner shards are typically equipped with high-end GPUs, such as NVIDIA GPUs Tesla A100s/H100s offering up to 312/624 FP16 TeraFLOPS, T4s with 65 FP16 TeraFLOPS, among other advanced models.

Task Assignment, Verification, and Rewards

Figure 4:
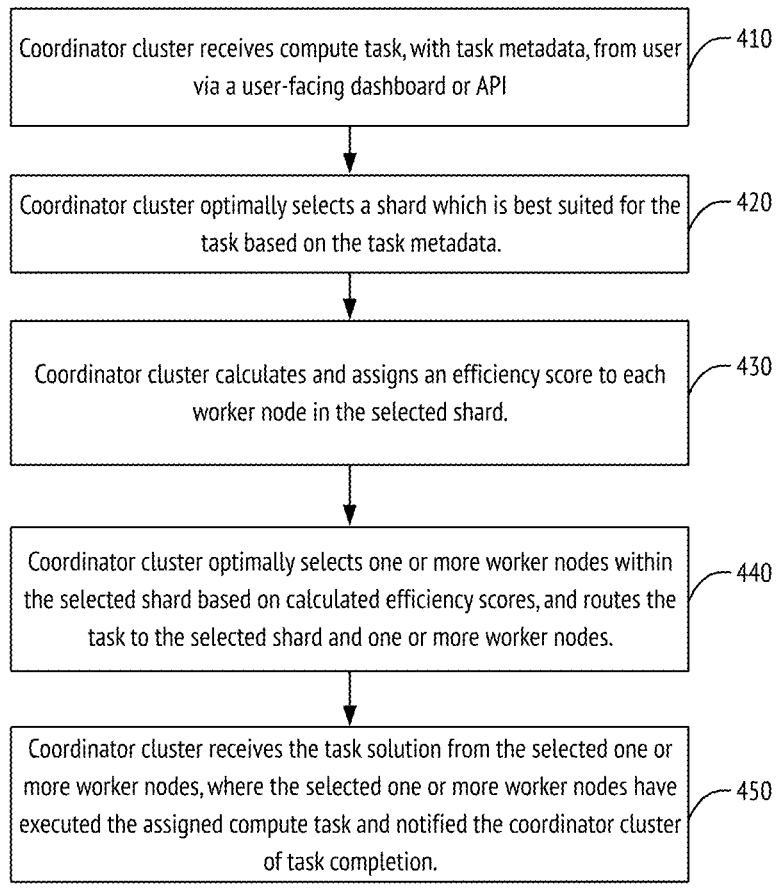
FIG. 4 shows a flowchart diagram for the task assignment process, in accordance with various embodiments of the invention.

FIG. 4 shows a flowchart diagram for the task assignment process, from the perspective of the coordinator, in accordance with various embodiments of the invention. In step 410, the coordinator cluster receives a compute task from a user, EdgeCloud customer, or partner through a user-facing dashboard or API for developers. Along with the compute task, the task metadata, which may comprise job type, resource requirements, and SLAs, is received by the coordinator cluster, which then decides which shard and worker nodes to which to assign the task.

To intelligently optimize the distribution of the compute task, in step 420, the coordinator optimally selects a shard which is best suited for the task based on the task metadata. The coordinator evaluates which shard the task should be assigned to based on the parameters of the task, which is described in the task metadata. For example, a training task for a machine learning model may require a cloud environment, so a cloud-based shard will be selected. Selection of shards may be based on parameters including but not limited to service level agreements and required computational resources associated with the task.

In step 430, after a shard is selected, the coordinator calculates and assigns an efficiency score to each worker node within the selected shard. The efficiency score of each worker node is a function of various factors that depend on both the task and the worker node, including, but not limited to, job type, job price, latency, worker node availability, computing capacity, reliability, and fairness. The efficiency score reflects the suitability of a node for the given task. Given a particular computing task, the coordinator cluster computes efficiency scores of worker nodes in real-time.

In step 440, the coordinator cluster optimally selects one or more worker nodes within the selected shard based on calculated efficiency scores of the worker nodes, and routes the task to the selected shard and one or more worker nodes. In some embodiments, the coordinator cluster selects one or more worker nodes with the highest individual efficiency scores in the shard.

The coordinator cluster may also ensure that tasks are distributed in a way that balances the load across the network, preventing any single shard or node from becoming a bottleneck. The coordinator cluster may also use reinforcement learning methods to determine the optimal task assignments and improve overall system efficiency. The coordinator cluster may continuously monitor the performance of shards and may adjust task assignments dynamically in response to changes in node availability, efficiency scores, or task requirements. A master cluster may also oversee task orchestration within the selected shard. By using this process, the coordinator cluster can optimize the distribution of tasks across the network, ensuring that each task is handled by the shard that offers the right mix of performance, reliability, and cost for the job's specific requirements.

In some embodiments, smart contracts may facilitate distributed computing and automatic reward processes. A smart contract may be triggered to verify a solution when the solution is received from an edge computing node, or be triggered to transfer a token award from a reward pool to an edge computing node if a notification is received from a task initiator indicating that a solution generated by the edge computing node has been successfully verified. In some embodiments, in step 440, the coordinator may create or register the compute task on the THETA blockchain by invoking a smart contract that is deployed on the THETA blockchain before routing the task to one or more edge computing nodes in a community shard or edge computing shard. The smart contract may have been previously deployed on the blockchain by the coordinator cluster or a third-party task server.

In step 450, the coordinator cluster receives a task solution from the selected one or more worker nodes, after the one or more worker nodes have executed the assigned compute task and notified the coordinator cluster of the completed compute task. In some embodiments, the selected one or more worker nodes notifies the master cluster in the shard which then notifies the coordinator cluster.

From the perspective of a worker node, the worker node may receive a task assignment and task data from the coordinator cluster if selected for a compute task. The worker node executes the assigned compute task and notifies the coordinator cluster of task completion. The worker node may communicate with other worker nodes and be orchestrated by a master node or master cluster within the worker node's shard.

As part of the incentivized edge computing network, edge computing nodes such as the worker nodes in the community shard 250 in FIG. 2 may be rewarded for compute tasks they complete. A reward may be in the form of a cryptocurrency token such as a THETA token, a THETA FUEL (TFUEL) gas token, TNT-20 tokens issued by THETA partner projects built on the THETA Metachain, any other token/cryptocurrency, or any form of an IOU that may be redeemable at a later time. The coordinator cluster will implement a reward module to calculate task rewards based on various factors, including but not limited to job type, correctness of the computation results, job completion time, and resource usage of the edge node. In some embodiments, the coordinator cluster may create a reward pool on a THETA blockchain in an optional step if such a reward pool has not already been established. In some embodiments, the coordinator cluster will also verify the correctness of computation results submitted by worker nodes such as edge computing nodes to prevent possible gaming of the system for token rewards by malicious edge node operators.

Figure 5:
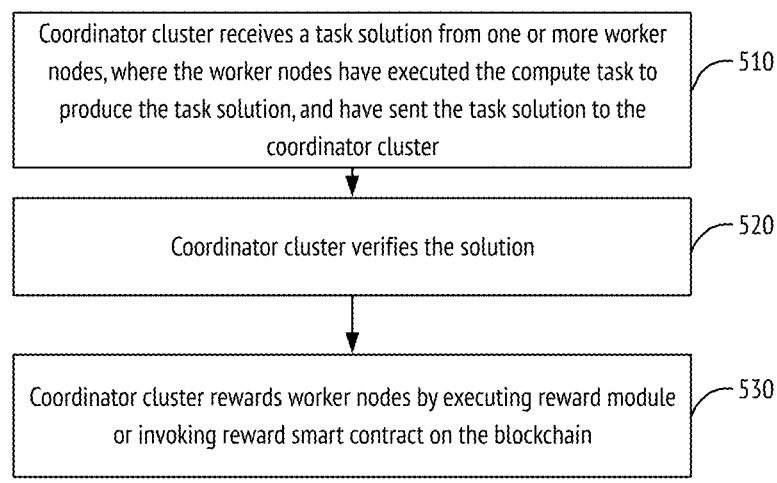
FIG. 5 shows a flowchart diagram for solution verification and rewarding worker node, in accordance with various embodiments of the invention.

FIG. 5 shows a flowchart diagram for solution verification and rewarding worker nodes, from the perspective of the coordinator, in accordance with various embodiments of the invention. In step 510, the coordinator cluster receives a task solution from one or more worker nodes, where the worker nodes have executed a compute task to produce a compute task solution and have sent the compute task solution to the coordinator cluster. In step 520, the coordinator cluster verifies the correctness of the submitted compute task solution. The coordinator cluster may verify correctness through the implementation of one or more of the following approaches:

Zero-knowledge based correctness checks: Zero-knowledge technology allows the public to check whether a task is completed as prescribed without revealing any specific details about the task itself and without disclosing the actual data or process involved. This is valuable for privacy and security, as it ensures that sensitive information remains confidential while still confirming the accuracy of the work performed. In some embodiments, the coordinator cluster uses zero-knowledge proof protocols including but not limited to zkSNARK and zkML, in which proofs can be made very short and fast to verify. In some embodiments, worker node clients may generate succinct correctness proofs for the compute jobs assigned to them, and upload the proofs along with the compute task results to the coordinator cluster. The coordinator cluster then verifies the proof and rewards the worker node only when the proof is valid.

Cross-verification: The vast parallel computing power of the EdgeCloud platform may be leveraged by assigning the same job to multiple worker nodes, and cross-verifying the results. The outputs from the multiple worker nodes are systematically compared to ensure consistency and accuracy. This cross-verification mechanism allows detection of discrepancies that may arise from computational errors or intentional manipulation by nodes. Inconsistencies between the results of different notes trigger an automated review process to maintain the integrity and reliability of the computational task.

Server-side stochastic verification: The coordinator cluster can randomly sample a subset of completed tasks and re-run those tasks on a set of trusted nodes. The results from the trusted nodes are then compared with the original solutions submitted by worker nodes to confirm the validity of the original submissions. This probabilistic approach to verification provides a scalable and efficient means of ensuring the accuracy of the computational work performed across the network, while maintaining a balance between resource expenditure and system integrity.

On-chain and off-chain verification: As previously mentioned, in some embodiments, the coordinator registers the task on the THETA blockchain by invoking a smart contract before routing the task to an edge worker node in a community shard. The smart contract may be triggered to verify a solution when the solution is received from an edge computing node, or edge worker node, in the community shard, which may be part of the THETA Edge network. In some embodiments, the coordinator cluster may submit the task solution to the smart contract to verify the solution on-chain. In some embodiments, the coordinator cluster may verify the solution off-chain. Both the on-chain and off-chain verification methods include the zero-knowledge based proofs, cross-verification, and stochastic verification mentioned above.

In step 530, the coordinator cluster rewards worker nodes by executing the reward module to calculate the reward that the one or more worker nodes should get, and may transfer rewards to the one or more worker nodes based on the calculated reward. As mentioned above, the reward module may calculate task rewards based on various factors, including but not limited to job type, correctness of the computation results, job completion time, and resource usage of the one or more edge worker nodes. In some embodiments, if the coordinator registered the compute task on the THETA blockchain before routing it to the one or more edge worker nodes, then the smart contract may also be triggered to transfer a token award from a reward pool on the THETA blockchain to the one or more edge computing nodes if a notification is received from the coordinator cluster indicating that a solution generated by the edge computing nodes has been successfully verified.

From the perspective of a worker node that has been selected to complete a compute task, the worker node executes the compute task to produce a task solution, and sends the task solution to the coordinator cluster. In some embodiments, the worker node generates a succinct correctness proof for the compute task, and uploads the proof along with the compute task results to the coordinator cluster. Upon verification of the task solution, the worker node receives a reward from the coordinator. The reward may be in the form of a cryptocurrency token and be drawn from a reward pool on a blockchain by the invocation of a reward smart contract on the blockchain.

As noted, in some aspects, cloud networks and edge networks can be considered complementary computing platforms. That is, cloud networks can have the advantages of being stable and highly available, while edge networks can be ubiquitous and have a virtually unlimited number of nodes. In some respects, edge nodes may be less powerful, but aggregated, the edge nodes can provide massive parallel processing power, while located closer to end users, thereby reducing data movement. Accordingly, the disclosed systems can feature a hybrid cloud-edge computing platform which can combine the strengths of edge networks and of cloud networks to satisfy a wide range of SLAs (incl. but not limited to latency requirements, storage, compute resources, reliability, etc.) and use an incentivized edge computing network with smart-contract and blockchain support, by performing efficient task assignment between cloud and edge computing networks.

Edge Computing Network

As used herein edge computing can refer to distributed computing systems which bring computation and data storage physically closer to the location where such resources may be needed, for example, to improve response times and save bandwidth. Edge computing can serve to move certain aspects of cloud computing, network control, and storage to network edge platforms, edge data centers, and/or devices that may be physically closer to resource-limited end devices, for example, to support computation-intensive and latency-critical applications. Accordingly, edge computing may lead to a reduction in latency and an increase in bandwidth on network architectures that incorporate both edge and core data centers. In some aspects, to provide low-latency services, an edge computing paradigm may optimize an edge computing platform design, aspects of which are described herein.

In some examples, edge computing can further include various technological computational techniques including, but not limited to, mobile cloud computing (MCC), cloudless, fog computing, mobile edge computing (MEC), combinations thereof, and/or the like. For example, a cloudlet can refer to a low-latency network architecture that can support certain applications such as augmented reality (AR) and image processing tasks. Cloudlets can further refer to virtual platforms within networks, for example, between a core data center and user devices. Edge cloud composites or edge cloud computing (ECC), as well as MEC, can provide services at the edge of a core network and can support multiple users. Fog computing can refer to extended cloud computing at the edge of networks. In some aspects, fog computing can include cooperation between edge devices in networks and may be used in enterprise applications. In various embodiments, it is to be understood that various aspects of the disclosed embodiments can be used in connection with one or more edge computing techniques described above, which may collectively be referred to as edge computing herein in the interest of brevity.

THETA Edge Computing Network Overview

Embodiments of the present invention are directed to a hybrid cloud-edge computing platform which comprises an incentivized and decentralized edge computing network or platform (hereafter the "THETA edge computing platform", "THETA edge computing network", "THETA edge network", "edge computing platform", "edge network", "edge computing network", or the like) in which peer-to-peer (P2P) computational resource sharing is facilitated through smart contracts on a blockchain (hereafter the "THETA blockchain", or "THETA ledger system", or "blockchain") maintained by a blockchain network (hereafter the "THETA blockchain network" or "blockchain network").

In the present disclosure, the term "THETA network" may refer to the THETA edge network, the THETA blockchain network, or combinations thereof, as would be clear to persons of ordinary skills in the art within the context of the detailed descriptions. In various embodiments, a smart contract-based infrastructure implements functionalities including, but not limited to, task assignment, data distribution, solution verification, reward pooling, and incentive micropayments. That is, peer edge nodes in the THETA network may invoke, via blockchain nodes, decentralized applications (DApps) in the form of smart contracts on the THETA blockchain to share redundant or unused processing power, to function as "edge computing nodes" or "edge workers", to support other peer nodes' computational demands by exploiting otherwise wasted idle CPU cycles, and to automatically receive rewards for the work done for other peer nodes.

A peer-to-peer (P2P) mesh network can allow interconnected peer nodes to share resources with each other without the use of a centralized managing server or stable host. The THETA network, as described in issued U.S. Pat. No. 10,771,524 (Methods and Systems for a Decentralized Data Streaming and Delivery Network, incorporated by reference in its entirety herein), enables the sharing of bandwidth by edge cacher nodes, to cache and/or relay video and other data, in a network infrastructure that is scalable to millions of concurrent users through native THETA blockchain protocol-level support for cryptocurrency micropayments. As bandwidth sharing utilizes minimal CPU and Graphical Processing Unit (GPU) resources, the present disclosure provides an additional framework to enable edge nodes to perform in a distributed manner storage intensive tasks, such as video storage and streaming, non-fungible token (NFT) storage, data storage generally, and generic computation tasks including but not limited to artificial intelligence (AI) and machine learning (ML) tasks.

In one aspect, embodiments of the present invention are directed to systems that enable a self-organized and dynamic universal edge computing and storage platform including task initiators and edge computing and storage nodes that interact directly with each other and with smart contracts hosted by the THETA blockchain. The THETA blockchain includes a decentralized public ledger system that builds upon a multi-level Byzantine Fault Tolerant (BFT), Proof-of-Stake consensus mechanism carried out by a small number of validator nodes and a large number of guardian nodes in the THETA blockchain network. The THETA blockchain can provide native protocol level support for resource-oriented micropayment pools and smart contracts for computation task management and solution verification and for storage management. A smart contract can include a self-executing contract or self-enforcing agreement in the form of computer programming codes or instructions managed by and stored on a blockchain. A smart contract can, in some respects, represent a DApp that is executed based on predetermined conditions or based on an agreement between participating parties. In various embodiments of the present invention, one or more smart contracts may be called or triggered to register computation tasks from task initiators, to verify solutions received from edge computing nodes, and to distribute token awards, for example from a reward pool, to edge computing nodes once solutions are verified. Depending on its size and/or format, the disclosed systems can verify a solution to a computation task on-chain through a verifier smart contract, or off-chain through the original task initiator.

The THETA decentralized computing and storage platform's decentralized nature and relatively low barrier to deployment allow peers to use the system for computation and storage tasks of both large and small scales, without the need for specialized project servers for task allocation and management. For example, Internet of Things (IoT) devices without a comparatively large amount of computation, storage, and/or battery power may delegate small computation and storage tasks to more capable neighbors close by. Further, individual users who do not own professional software on powerful enough personal computers can put up simple image rendering tasks for individual edge workers. Developers can tap into the system to delegate computation and/or storage intensive tasks such as machine learning model training and evaluation to hundreds of edge workers, gaming and video streaming platforms that already have millions of concurrently active users can distribute rendering and transcoding jobs among its own users seamlessly. Further, large-scale scientific projects such as SETI@home and Folding@home are inherently compatible with the THETA platform.

Furthermore, as edge computing nodes can be automatically awarded and incentivized for their work and storage resources, participants in the THETA edge computing and storage network may be more likely to provide significant contributions in a reliable manner when compared to existing crowd-sourcing donation platforms that run on volunteer computers, with many more edge computing and storage nodes that are able to participate. Additional protection against malicious task initiators can further be provided by the smart contracts via techniques such as collateral locking and reputation ranking.

In short, the THETA decentralized edge computing and storage platform combines the advantages of P2P distributed computing and storage techniques and blockchain-based smart contracts to achieve high scalability and high resource availability, and attains the following characteristics:

Organic network growth over full decentralization: the THETA network is self-organizing, self-adaptive, self-evolving, highly available, scalable, and robust, with minimal operational overhead, and with plug and play capabilities where a peer node (e.g., a task initiator or an edge worker) can join or leave at any time;

Incentivization to encourage the abundance and diversity of computation resources: the THETA network provides blockchain and smart-contract supported incentivization for task completion, with high transaction-throughput micropayments enabled; and Universality: the THETA network can support a wide range of computational and storage tasks with configurable task metadata and/or parameters on input/output data size and format, solution accuracy, precision, and computation delay, etc., and further with options for task batching and subdivision.

Figure 6:
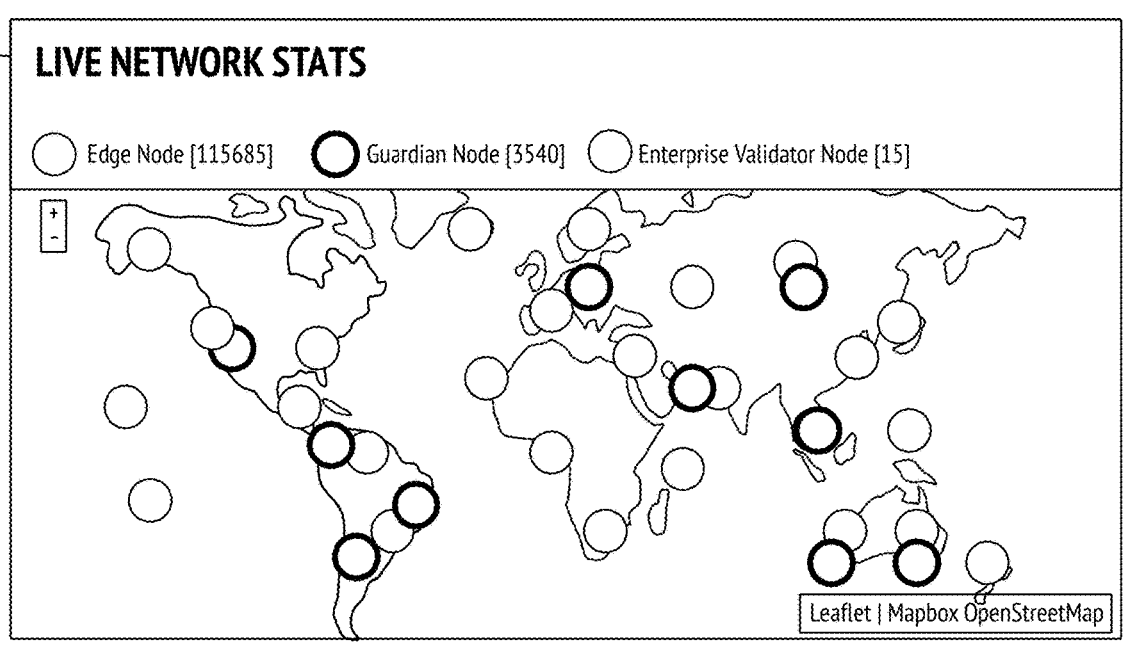
FIG. 6 shows an example diagram of an edge network (e.g., THETA edge network) used by the disclosed systems, in accordance with various embodiments of the disclosure.

FIG. 6 shows an example diagram 600 of an edge network (e.g., THETA edge network) used by the disclosed systems, in accordance with various embodiments of the disclosure. As noted, the edge network can include various nodes such as edge nodes, guardian nodes, and/or validator nodes. The nodes (e.g., over 10,000 nodes) can be distributed across many locations (e.g., across servers and/or devices the world running a THETA platform). In some respects, the disclosed systems can include an edge network that features scalability of nodes (e.g., a distributed network nodes around the world). In other respects, the disclosed systems can include a relatively high availability given an architecture featuring a mix of cloud-based virtual machines (VMs), devices such as laptops or desktops, and servers, such that there may not be a single point of failure. Further, in some respects, the disclosed systems can feature enhanced computational resources including a relatively large amount of idle CPU/GPU and memory/storage that can be harnessed into parallel processing power. For instance, THETA's global network of nearly 10,000 active edge nodes run by community members comprises one of the largest clusters of distributed GPU computing power in the world. High performance GPUs (~1000 nodes) deliver 36,392 TeraFLOPS, Medium tier GPUs (~2000 nodes) deliver 28,145 TeraFLOPS and Low end GPUs (~7000 nodes) deliver an additional 13,002 TeraFLOPS, for a total of approximately 77,538 TeraFLOPS or about 80 PetaFLOPS, roughly equivalent to 250 NVIDIA A100s, which are always available on the THETA global edge network. In other respects, the disclosed systems can include a user-friendly user interface such that workloads and jobs can be run in the background with no user interaction required.

In what follows, a THETA decentralized edge computing and storage platform and infrastructure are disclosed, the software architecture of individual nodes within the THETA edge network is presented.

Decentralized Edge Computing Network Architecture

In one embodiment, the decentralized edge computing platform involves two main types of nodes and associated smart contracts—task initiators and edge computing nodes.

A task initiator represents any entity that uses the edge computing platform to solve its computational tasks. In some aspects, a task initiator in the edge network may correspond to coordinator clusters or coordinator cluster nodes in the cloud-edge computing architecture, or master cluster nodes within a given shard or edge network as previously described. The task initiator posts tasks for the edge computing nodes to download and solve. It is also responsible for registering the tasks on the blockchain and providing the rewards for each task. The tasks can be anything ranging from solving a set of equations to transcoding a video, to AI and ML tasks including but not limited to training and deploying neural networks, large-language models, or other machine learning models.

Edge computing nodes poll the task initiator to get and complete the tasks. An edge computing node is a generic computational platform which can host various software, including the solver for the tasks issued by the task initiator. Once a task is solved by an edge computing node, it can upload the solution. Edge computing nodes may also be known as "edge worker nodes" or simply "edge nodes."

The "smart contracts", hosted by the blockchain, act as a trustless escrow for the task rewards. Once a submitted solution is verified, the reward will be transferred to the solver (i.e. an edge computing node) automatically and transparently.

In short, and according to one embodiment, the system comprises task initiator nodes or clusters that initiate computation tasks, and edge computing nodes that execute computation tasks and receive micropayment rewards for completion of the computation tasks. Furthermore, the solutions can be verified by on-chain directly by the smart contract, or verified off-chain by the task initiator.

In some decentralized computing and storage projects, individual nodes or users are connected to a server directly to obtain allocation and assignment of computational and/or storage related tasks. In some cases, individual users in a local area network may be organized into and function as a worker farm to solve tasks from a central server. By comparison, nodes within a P2P distributed storage network can communicate directly with each other, without the need for a central server. Some advantages of P2P resource sharing include network availability and robustness. Peers can become available at any time, and storage tasks can be batched or subdivided depending on resource availability (e.g., compute, network, and/or storage availability).

Figure 7:
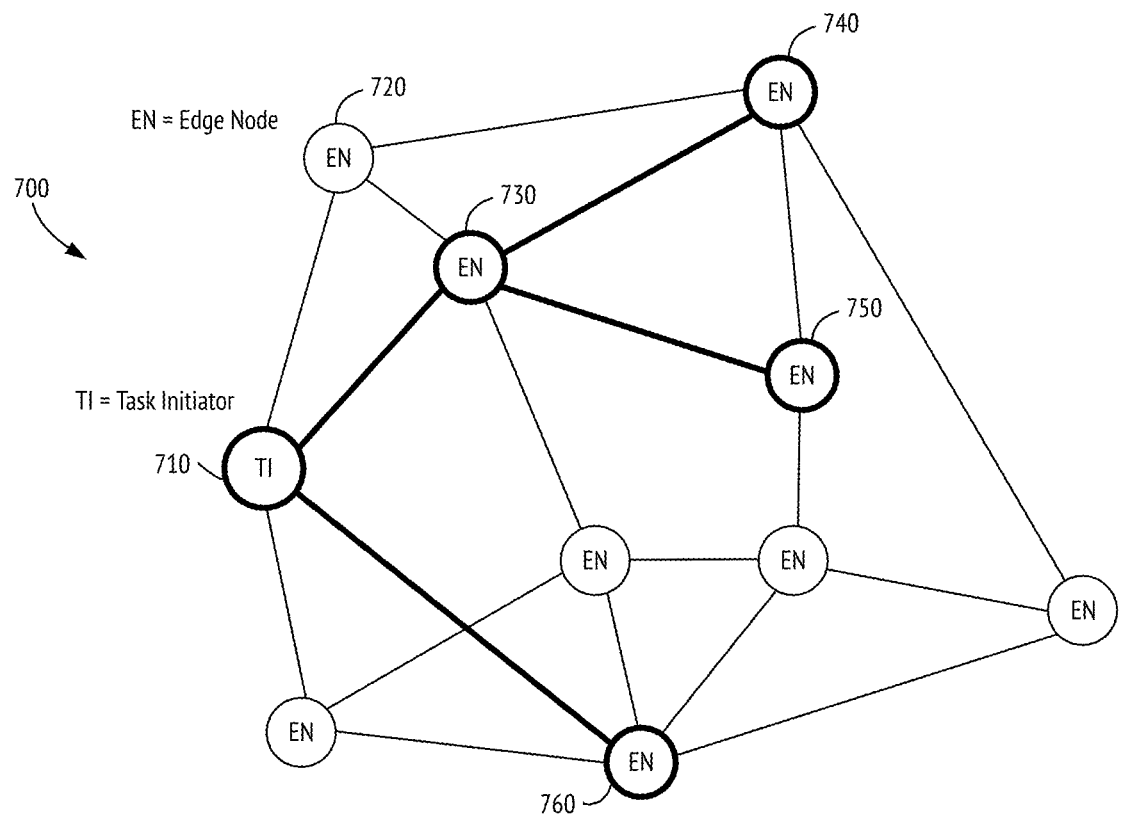
FIG. 7 is an illustrative network diagram showing a blockchain and smart contract-supported decentralized edge computing platform, according to one embodiment of the invention.

FIG. 7 shows a diagram for at least a portion of an illustrative peer-to-peer network architecture for a THETA decentralized edge computing platform 700, according to one embodiment of the present invention. In particular, the THETA edge network 700 may include multiple edge nodes ("EN") connected via P2P connections, including one or more task initiators ("TI") such as 710, and one or more edge workers or edge computing nodes such as 720, 730, 740, 750, and 760. In various embodiments, edge nodes in THETA network 100 may use any peer discovery techniques to self-organize into a semi-randomly connected peer-to-peer network based on one or more parameters, including, but not limited to, node specifications, bandwidth availability, network distance, geo-distance, and/or other system specification and availabilities. In some embodiments, network or geo-distances may be estimated and edge nodes within a certain threshold distance may be selected for P2P resource sharing. For example, task initiator may utilize the connectivity between IP addresses collected in the past to analyze and select candidate edge computing nodes. In some embodiments, peer selection and task assignments are made independent of the distance between nodes, especially with tasks that can tolerate high computation and transmission delays. Exemplary peer-discovery techniques include but are not limited to, distributed hash tables, use of tracker servers, Domain Name System (DNS) query-based initial peer list bootstrapping, combinations thereof, and/or the like.

In some embodiments, edge computing nodes with specs above a certain threshold may be made available for particular task initiators known to host difficult tasks that require more than a threshold number of parallel processors, a threshold number of CPU cycles, with specific needs on local storage or computation delay, with additional requirements on solution precision, or the like. In some embodiments, some edge computing nodes may be partitioned into clusters, for example, based on task type, and to share rewards from the same reward pool. In some embodiments, edge computing nodes are not partitioned into clusters, to improve robustness of the network at least because the network may continue to function if any task initiator or edge computing node leaves the network. As more edge nodes are added to the network, the network may become more efficient and may achieve higher computation offload.

In the present disclosure, "edge nodes" refer to individual peer nodes in the THETA network. The THETA network may implement Edgecast functionalities for data and bandwidth resource sharing, as well as edge compute functionalities for computation resource sharing. Edgecast refers to data and/or bandwidth resource sharing over the THETA edge network. Thus, an edge node may be implemented to function as one or more of an edge cacher, a viewer, a task initiator, or an edge worker. An edge cacher node shares its storage and bandwidth resources with other peers; a viewer node downloads data from edge cacher nodes; a "task initiator" or "task server" node uses the THETA network to solve its computational tasks; while an "edge worker" or "edge computing node" is a generic computational platform or generic end user client that shares and contributes its processing power and CPU time to solve computational tasks registered by task initiators in exchange for rewards. In what follows, unless otherwise specified, the terms "edge node", "edge computing node", and "edge worker" may be used interchangeably, with the understanding that an edge node can implement one or more protocols to share with others, or receive from others, one or more types of resources. Similarly, unless otherwise specified, the terms "THETA Network", "THETA Decentralized Network", "THETA Edge Computing Platform", "THETA Edge Computing Network", "THETA Edge Network", and "THETA EdgeCast Network" are used interchangeably, with the understanding that the THETA network is designed for the universal sharing of different types of resources among its member peer nodes.

In some embodiments, an edge computing node such as 730 in FIG. 7 is a generic computational platform that hosts various software including a solver for tasks issued by task initiator 710. In some embodiments, dedicated programming instructions, add-ons, plugins, or software packages, and/or standalone software applications may be provided to edge worker 730 by the THETA platform for use in solving one or more tasks. In some embodiments, a user client module, a library, or a software development kit (SDK) may be provided, integrated directly into, and interface with edge computing node 730's existing computing environments and/or installed proprietary software to solve different types of computation tasks.

Task initiators are computing entities including but not limited to coordinator clusters, coordinator cluster nodes, master cluster nodes, master nodes, users or user computers that utilize the THETA edge computing platform to solve their computational tasks. In the exemplary setup shown in FIG. 7, edge nodes that are actively participating in edge computing for task initiator 710 are shaded in dashed lines. Task initiator 710 posts tasks, edge computing nodes 730 and 760 download and solve such tasks, and edge computing node 730 may further distribute computation sub-tasks to other peers 740 and 750. Task initiator 710 may register tasks on the THETA blockchain and provide rewards to edge workers, including edge computing nodes 730 and 760, who complete the tasks. A reward may be in the form of a cryptocurrency token such as a THETA token, a THETA FUEL (TFUEL) gas token, any other token/cryptocurrency, or any form of an IOU that may be redeemable at a later time. In some embodiments, a task initiator may have one or more associated scores indicating its task load, priority, urgency, delay requirement, reward amount and history, trustworthiness, and similar characteristics. Such scores may be used for matching tasks with edge computing nodes, task allocation and assignment, and/or tiered rewarding strategies and payment pool creation and management. In some embodiments, a task initiator may include local computation modules for verifying the quality of a solution, for example using measures for correctness, accuracy, error residual, confidence levels, and the like, depending on the nature of the original computation task.

Once a task is solved by edge computing node 730, the edge computing node may upload the solution directly to task initiator 710, or indirectly through another intermediate node or network, and in turn be rewarded once the solution has been verified. In some embodiments, each edge computing node may have one or more associated availability scores indicating its up time, response time, its "skill level" or hardware specification (e.g., processor number, speed, memory size, bandwidth, memory storage, combinations thereof, and/or the like), and other characteristics such as computation history. Such availability scores may be used for task/job matching, or task allocation and assignment by task initiators. In the THETA EdgeCloud platform, the coordinator cluster serving as a task initiator may use such availability scores in calculating the efficiency score of each edge worker node for a given task.

In what follows, both task initiators and edge computing nodes are discussed in exemplary embodiments, for illustrative purpose only, without limiting the scope of the methods, systems, and devices as disclosed herein, which are capable of distributing or performing computation tasks with various latency, accuracy, or precision requirements. "Computation", "computation task", "computation task", or simply "task" refers to any computer-executed processes that use multiple CPU cycles to execute a given set of computation instructions, to convert a set of input data into a set of output data, and/or to compute a "solution" to a proposed or registered problem. Exemplary computation tasks include, but are not limited to, any one or combination of data cleaning, search, comparison, sampling, interpolation, extrapolation, transformation, transcoding, equation solving, statistical analysis, numerical modeling, and machine model training, validation, and evaluation, including machine learning models, AI models, and the like. A solution to a task may take on different alphanumerical formats and sizes depending on the nature of the task, and a solution verification process may check whether the solution meets one or more given conditions or requirements.

For example, an integer factorization task may result in a unique deterministic result in the form of numerical tuples that can be multiplied together to verify its correctness. On the other hand, a video transcoding task may have multiple video output files as the solution, each with a different resolution. Each video file may be sampled to verify its resolution meets an initial requirement of the task, while being a non-unique output file at that particular resolution, depending on the transcoding technique used. Some tasks may be batched together, while some may be subdivided. For example, an edge computing node such as 730 in FIG. 7 may further distribute computation sub-tasks to its peers 740 and 750, and each of edge computing nodes 730, 740, and 750 may be rewarded proportionally for its participation in completing a computation task as originally proposed by task initiator 710, once a solution or sub-solution is verified.

Moreover, a task initiator or an edge computing node may receive, store, and transmit chunks, fragments, slices, or batches of input data, output data, data hashes, problem stems, and/or task metadata, and may support "range requests" to avoid the need to download or upload a relatively large chunk of data when only a relatively small fraction is needed.

As discussed, although individual nodes are labeled as either a task initiator or an edge computing node in FIG. 7, in some embodiments, a peer node in the THETA network may be configured to function as both a task initiator, such as a master cluster or master cluster node, and an edge computing node. For example, edge computing node 730 may poll several task initiators including task initiator 710 for tasks to solve, and itself may also be polled by edge computing nodes 740 and 750 for tasks or sub-tasks to solve, depending on the priority, urgency, difficulty level of the problem, and the amount of reward offered. In another example, edge nodes 740 and 750 may exchange computation resources, where each node uses a software that the other node does not have to complete a task for the other node.

Blockchain and Smart Contract Support in Edge Computing Network

Figure 8:
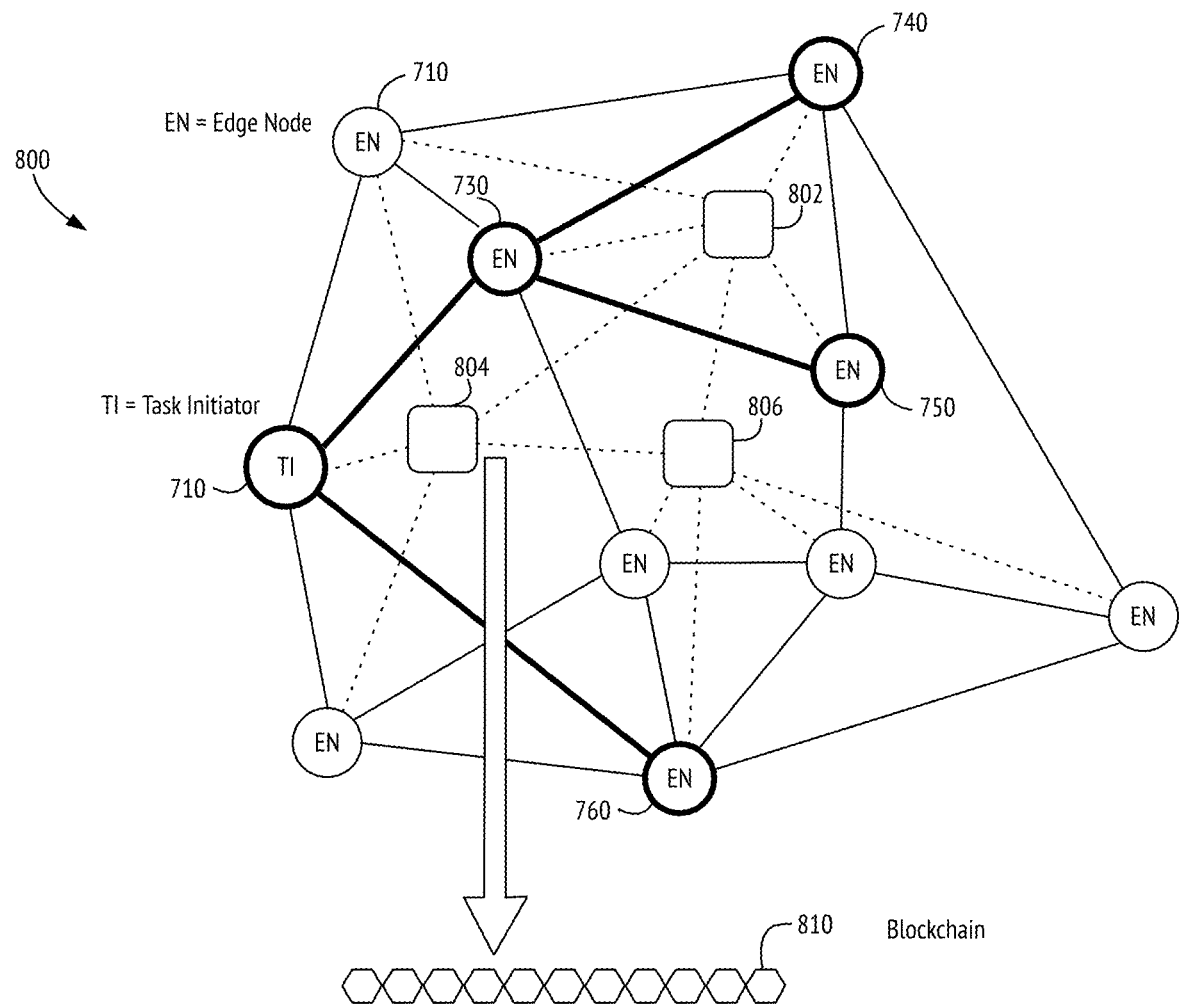
FIG. 8 is an illustrative network diagram showing the decentralized edge computing platform supported by a smart contract-enabled blockchain, according to one embodiment of the present invention.

To facilitate task allocation, assignment, solution generation, verification and rewarding, a THETA blockchain network may provide native protocol level support for reward pools and smart contracts. FIG. 8 is an illustrative network diagram 170 showing the decentralized edge computing platform 800 as supported by a smart contract-enabled blockchain 810, according to one embodiment of the present invention. A blockchain such as 810 can include a list of public transaction records, or blocks, linked through cryptography, and typically managed by a blockchain peer-to-peer network, as illustrated by blockchain nodes 802, 804, and 806. Each edge node in the THETA decentralized network is connected to at least one blockchain node in FIG. 8. In some embodiments, edge nodes may function as blockchain nodes and may participate in transaction verification, block assembly, and smart contract execution as well. In some embodiments, edge nodes may be rewarded for being up and running within the THETA network.

While some payment systems may use a central authority to verify and clear transactions to maintain trust, a blockchain ledger can achieve global, decentralized consensus without such a central authority. The THETA blockchain uses a Proof-of-Stake (POS) distributed consensus approach, carried out by a small number of validator nodes and a large number of guardian nodes in the THETA blockchain network. In this approach, a blockchain node may mine or validate a block according to various combinations of random selection, wealth and/or age (i.e., the "stake"). For example, a stake may be a fixed amount of cryptocurrency funds (e.g., THETA tokens) that is committed to the blockchain by a miner in order to participate in block creation and validation. The more stake a miner commits, the more mining power it may have. In various embodiments, other types of block consensus mechanisms such as Proof-of-Work, Proof-of-Engagement may be used instead. Furthermore, smart contracts are immutable computer programs executed and ran deterministically on blockchain nodes. Once deployed, a smart contract can be executed but cannot be changed. Each edge node in the THETA decentralized network may access smart contracts deployed on blockchain 810 to participate in distributed computing as disclosed herein.

Reward and Verification Processes

In some embodiments, smart contracts may facilitate distributed computing and automatic reward processes. That is, the deployment of smart contracts on the THETA blockchain may allow computing tasks to be registered, "published", or "posted", verified, and further paid for when verified. A smart contract may be triggered to verify a solution when the solution is received from an edge computing node, or be triggered to transfer a token award from a reward pool to an edge computing node if a notification is received from a task initiator indicating that a solution generated by the edge computing node has been successfully verified.

Solutions may be verified by various methods. For example, in some embodiments, the solution may be verified directly. Alternatively, in other embodiments, the solution may be verified indirectly, for example by verifying a sub-part of the solution. In yet other embodiments, the same problem may be sent to two or more edge computing nodes, and the solution may be verified by comparing the solution from each edge computing node. In the case of more than two edge computing nodes providing a solution, the solution from a majority of the edge computing nodes may be selected. Finally, in yet other embodiments, the solution may not be verified directly, but the solution can be estimated to be correct based on various factors, including a reputation score of an edge computing node. In short, a solution may be verified by checking that the solution meets one or more criteria.

In some embodiments, the task solution does not need to be kept secret. For such cases, unencrypted or plain-text solutions may be submitted to a blockchain smart contract directly for on-chain verification.

In some embodiments, the task initiator may be configured to not reveal solutions to the public. For such cases, an edge computing node may submit encrypted solutions to the blockchain. For a smart contract to verify the correctness of an encrypted solution without decrypting it, zero-knowledge proof techniques like non-interactive zero-knowledge proof may be used. In cryptography, a zero-knowledge proof technique or protocol is a method in which a first party known as the "prover" can prove to a second party known as a "verifier" that the prover possesses knowledge of certain information without revealing the information itself, or any other information apart from the fact that the prover knows the information. A non-interactive zero-knowledge proof is a zero-knowledge proof that requires no interactions between the prover and verifier.

In some embodiments, one or more edge computing node may send task solutions to the task initiator. The task initiator may verify the solutions off-chain and call smart contracts to reward one or more edge computing nodes which have completed the task or sub-tasks of the task.

Edge Node Implementation

As previously mentioned, in some embodiments, an edge computing node in an edge computing network is a generic computational platform that hosts various software including a solver for tasks issued by a task initiator. In some embodiments, dedicated programming instructions, add-ons, plugins, or software packages, and/or standalone software applications may be provided to an edge worker node by the THETA platform for use in solving one or more tasks. In some embodiments, a user client module, a library, or a software development kit (SDK) may be provided, integrated directly into, and interface with edge computing node's existing computing environments and/or installed proprietary software to solve different types of computation tasks.

Figure 9:
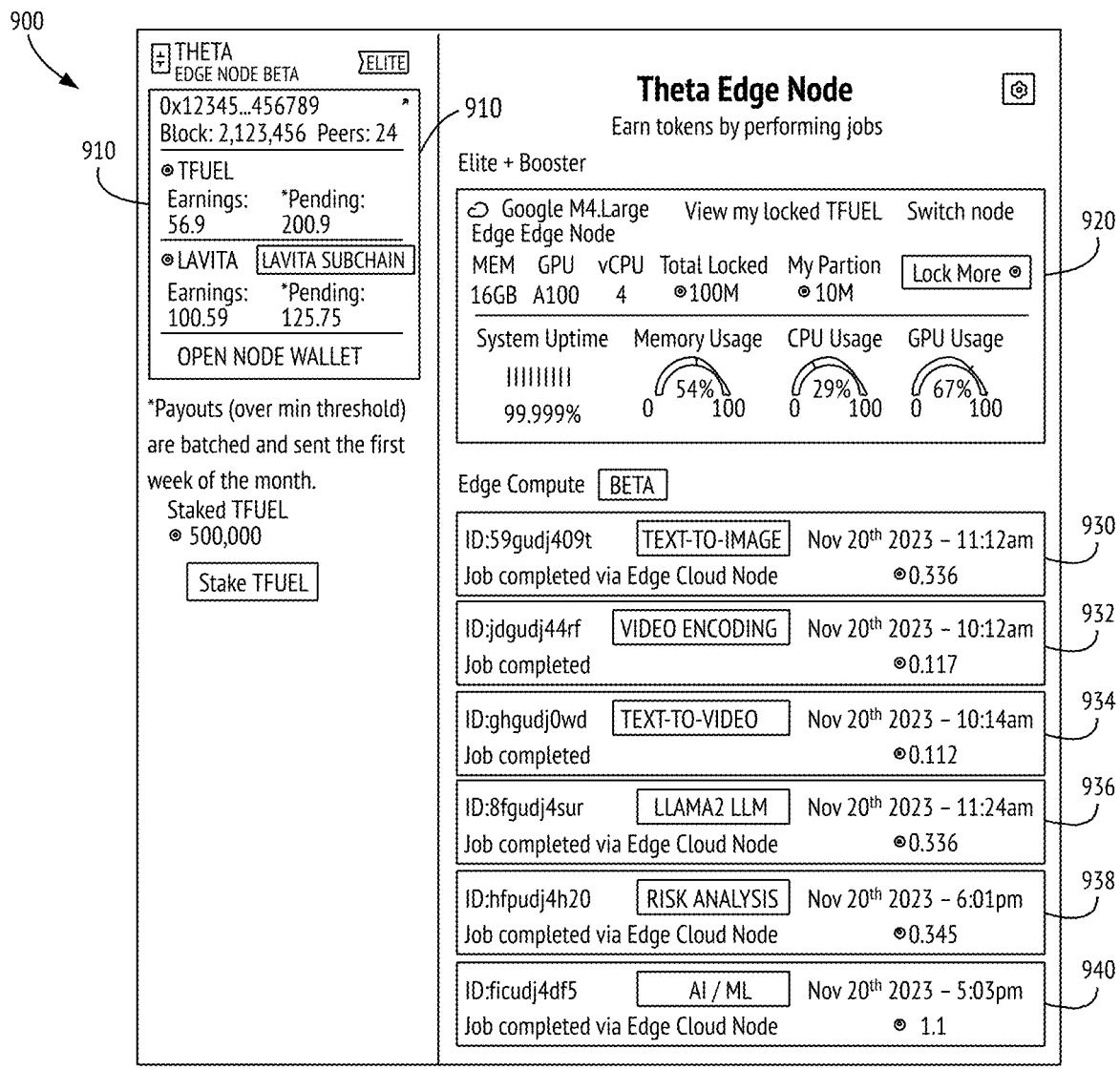
FIG. 9 shows an example user interface for an edge computing node client software, in accordance with example embodiments of the invention.

FIG. 9 shows an example user interface 900 for an edge node associated with the disclosed systems, in accordance with example embodiments of the disclosure. In some aspects, a non-technically inclined user can simply download a THETA edge node software associated with the disclosed systems, and can run the software in the background, such that active interaction by the user with the software is minimized. In some aspects, the diagram 900 shows a user interface can provide job/workload status indications and/or feedback (e.g., from performing compute tasks by the user's device serving as an edge node). In some respects, the disclosed systems can show in a panel 910 an amount of cryptocurrency available and/or earned and/or related statistics related to a given edge node. In other respects, the disclosed systems can show an edge cache, with cache jobs that are scheduled for completion by one or more nodes of the THETA edge network. In widget 920 an edge node may select a preferred managed worker node managed and hosted by the THETA EdgeCloud platform to support in compute tasks. In yet other respects, as shown in diagram 900, the disclosed systems can show a particular job along with a status (e.g., completed), an identifier, a type (e.g., video encoding, AI/machine learning type job), a time of completion, and a cryptocurrency usage or payout associated with the workflow/job. For example, widget 930 displays a job completion status for a text-to-image compute task which was completed in cooperation with a managed node hosted by the THETA EdgeCloud platform. Widget 930 also shows the amount of cryptocurrency rewarded to the edge node task completion. Likewise, widget 936 and widget 938 each display job completion statuses and cryptocurrency rewards for running a Llama2 large language model (LLM) and running a risk analysis task, respectively, in conjunction with a EdgeCloud-hosted worker node. Widgets 932, 934, and 940 display job completion statuses and cryptocurrency rewards for a video encoding task, text-to-video task, and AI/ML task completed by the edge node. In some aspects, jobs can be initiated as soon as they are assigned or can be scheduled based on a predetermined mechanism for optimal latency reduction and/or performance enhancement.

Figure 10:
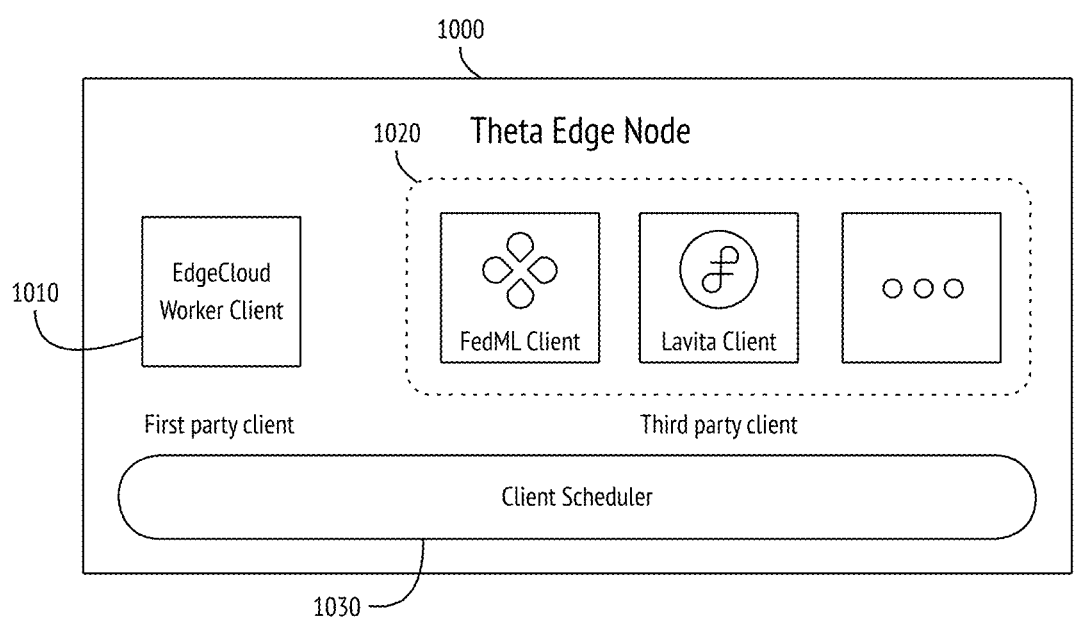
FIG. 10 is an illustrative diagram of the first and third-party clients on an edge computing node.

FIG. 10 is an illustrative diagram of the first and third-party clients on an edge computing node 1000. Each edge worker node 1000 support both first party clients 1010 and third party clients 1020. In some embodiments, the edge node software also implements a client scheduler 1030 which launches and coordinates various clients to execute a compute task. If the client is containerized, the edge node software executes the container, which encapsulates the client application and its dependencies, ensuring that it runs in a consistent and isolated environment. Once the client is running, the edge node software takes on the role of coordinating its activities. This includes managing the computational tasks assigned to the client, handling communication between the client and other parts of the THETA EdgeCloud infrastructure (such as the coordinator cluster or other edge nodes), and ensuring that the client's computational tasks are executed efficiently.

Distributed Storage in Edge Computing Network

In some decentralized computing and storage projects, individual nodes or users are connected to a server directly to obtain allocation and assignment of computational and/or storage related tasks. In some cases, individual users in a local area network may be organized into and function as a worker farm to solve tasks from a central server. By comparison, nodes within a P2P distributed storage network can communicate directly with each other, without the need for a central server. Some advantages of P2P resource sharing include network availability and robustness. Peers can become available at any time, and storage tasks can be batched or subdivided depending on resource availability (e.g., compute, network, and/or storage availability).

In various aspects, the disclosed systems (also variously referred to as a THETA EdgeStore network herein), can include systems and methods for an append-only, content-addressed, decentralized, and in some cases, an object-based (e.g., key/value based) storage network for use in association with the permanent web (e.g., the world wide web). Further, the disclosed systems can also serve as a decentralized content delivery network (dCDN) of stored content, and the dCDN can be file-type agnostic (e.g., can support video, live streaming, audio, text, complete websites, and the like having any suitable formatting).

In some aspects, the disclosed systems can include a platform (e.g., a software-based platform) such as the THETA EdgeStore for providing and computing workloads on decentralized content and storing results using a hybrid cloud-edge architecture featuring the THETA blockchain. It is understood that other names and associated platforms having similar functionality can be generated and used by anyone of ordinary skill in the art to achieve similar or identical functionality as that described herein. In some respects, the disclosed systems can include an EdgeStore network that can serve as an append-only, content-addressing, decentralized object (e.g., key/value) based storage network for the permanent web. In some respects, the disclosed systems can include an EdgeStore implementation of a technique (which can be called "flexible sharding") which can serve as a probabilistic extension of the peer-to-peer distributed hash table (DHT), Chord DHT.

In some aspects, an EdgeStore node not only stores permanent data shards (associated with a portion of a file that is being stored) assigned to it, but also caches the popular contents locally on its device. Therefore, in addition to providing storage capability, the disclosed systems and associated network also act as a decentralized content delivery network (dCDN) that can share content and be file-type agnostic. Further, a wide array of decentralized applications can be built on top of the THETA EdgeStore, including but is not limited to the following: permanent storage for the digital assets of NFTs (e.g., images, videos); data availability service for layer2 scaling solutions such as rollups; dCDN for video, music, game patches, software updates, and the like; storage backend for general web3 decentralized applications (DApps) such as blogging sites, chat apps and the like, decentralized app stores, decentralized code (e.g., GITHUB) repositories, and the like; storage for digital assets (e.g., Metaverse related digital assets), e.g., the 3D models of the characters and buildings in the virtual reality worlds; storage for training data sets for artificial intelligence (AI) algorithms, such as autonomous driving, protein folding, and the like.

The disclosed systems involve multiple types of distributed storage services within the hybrid cloud-edge computing platform. In addition to the distributed storage systems and use cases previously described, the THETA EdgeCloud platform may also include:

Temporal storage: Temporal storage within the EdgeCloud platform is provisioned for temporary retention of data, such as training data used in the training phase of AI models. This enables quick, low-latency access to facilitate retrieving and processing data, and enhances the efficiency of compute-intensive jobs including but not limited to machine learning and data analysis tasks.

Persistent storage: The EdgeCloud storage system may be used to host distributed databases, which require not just persistence of data but also the ability for the storage to be updated. One such type of database that has gained significant among the machine learning community in recent years is the vector database. Vector databases are ideal for applications that require fast and accurate similarity search, including but not limited to recommendation systems, natural language processing, and computer vision. Vector databases make it easier for machine learning models to retrieve external knowledge based on similarity searches.

Immutable storage: Traditional media files including video on demand (VOD) content, and NFT data files require immutable storage. Immutability means that once a file or digital content is stored, it cannot be altered, tampered with, or deleted, thereby ensuring the integrity of the stored content. This characteristic is crucial for NFTs and media files because they represent ownership or provenance of unique digital items or content such as digital art, collectibles, or other virtual assets.

In many cases, a worker node may need to access local storage while performing a compute task. For example, a worker node running a machine learning algorithm may need to access and load training data in the process of training a machine learning model. In the case of model inference, a worker node running a machine learning algorithm may need to query a vector database for external knowledge. In the case of video transcoding, a worker node may need to load the original source video file in order to run transcoding algorithms. The THETA EdgeCloud platform accounts for storage resources utilized various modalities including temporal, persistent, and immutable modes. In some embodiments, rewards for completing compute tasks include compensation for the associated storage utilized. This reward mechanism aligns the incentives of worker nodes with the efficient and effective use of the distributed storage system with the hybrid cloud-edge computing platform.

Exemplary Cloud-Edge Computing Pipeline Architectures and Applications

Figure 11:
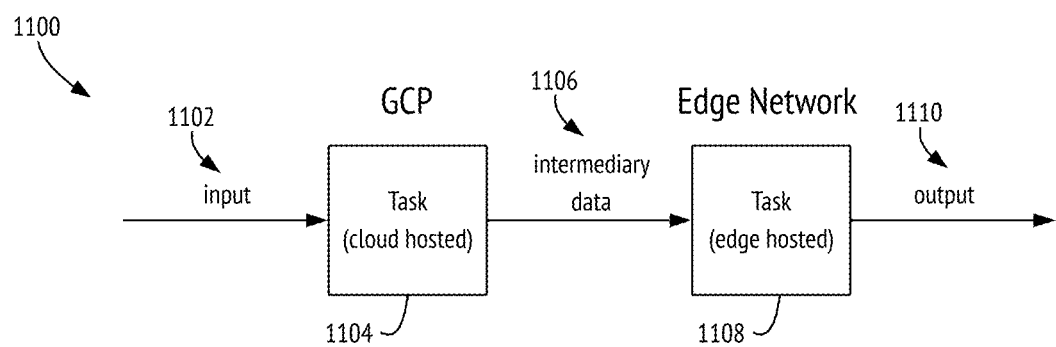
FIG. 11 shows an example diagram of a pipeline architecture for running workloads on the disclosed systems featuring a hybrid platform consisting of the cloud network and an edge network (e.g., a THETA edge network), in accordance with example embodiments of the disclosure.

FIG. 11 shows an example diagram of a pipeline architecture 1100 for running workloads on the disclosed systems featuring a hybrid platform consisting of a cloud computing network (e.g., GOOGLE Cloud Platform (GCP)) and an edge computing network (e.g., a THETA edge network), in accordance with example embodiments of the disclosure. As shown in diagram 1100, the task and input data 1102 is routed by the coordinator cluster of the THETA EdgeCloud platform to a cloud computing shard such as the GCP, which runs one or more cloud-hosted computation tasks or models 1104 to output the intermediary data 1106. Then, the intermediate data 1106 and task information for one or more computation tasks or models 1108 is routed by the coordinator cluster to a shard in the edge network, which processes the tasks or models 1108 and produces the final output 1110. Although the diagram only shows two tasks, in real applications a workflow could utilize multiple tasks, where each task may comprise a different computational model, as shown in later figures. In various aspects, the pipeline architecture can comprise any order of networks to process computation tasks (e.g., running a computation task on an edge-based network followed by a computation task on a cloud-based network). In various aspects, a pipeline architecture featuring a task pipeline can allow for the disclosed systems to execute a workflow using multiple deep learning models consecutively. Some of these tasks can include running one or more proprietary models accessible only through a cloud network's API via specific commands. Others can be open-sourced models that can be served by the THETA edge network leveraging a massive parallel processing power of the edge network nodes. Within the pipeline architecture, data, such as intermediate input and output data, may be transferred between nodes hosting different models through a peer-to-peer network, a shared storage system, or other data transfer means.

In some respects, a task from a given edge node or task initiator can be registered on a blockchain and assigned to an edge computing node within a decentralized computing network, with task details sent by the coordinator cluster, serving as a task initiator, to the edge computing node through a secure peer-to-peer connection. The edge computing node determines a solution to the computation task. The solution may be verified on-chain by a smart contract, and a token reward from the task initiator may be given to the edge computing node by the smart contract correspondingly.

Figure 12:
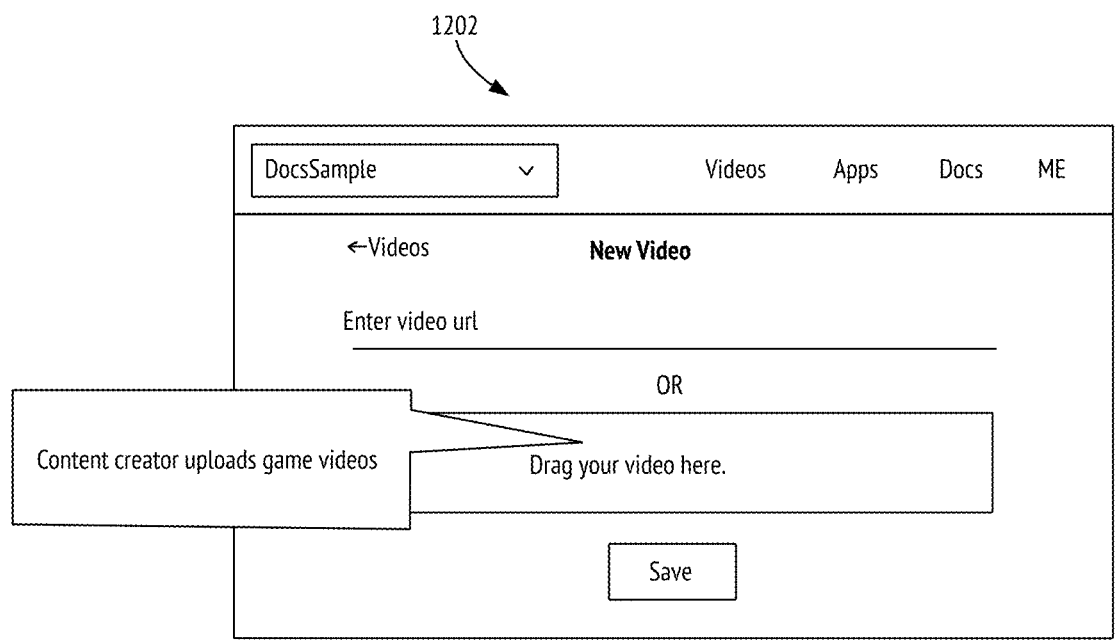
FIG. 12 shows an example of the disclosed systems using a task pipeline architecture for a first use case application for a semantic video search, in accordance with the example embodiments of the disclosure.
Figure 12:
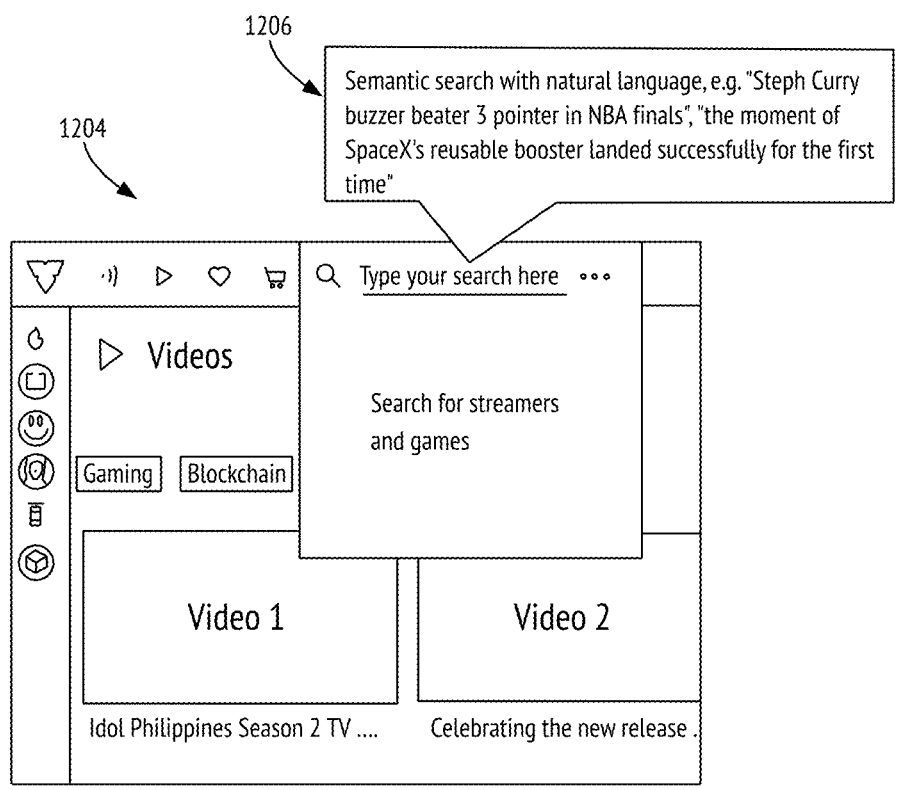

FIG. 12 shows an example of the disclosed systems using a task pipeline for a first use case application in a semantic video search, in accordance with the example embodiments of the disclosure. Traditionally, video search only allows searching a query against the title, description, and tags of the video. These text descriptions are typically provided by the video uploaders (e.g., users), which can sometimes be of poor quality and may not be able to capture the full details of the video. Using the task pipeline described herein, the disclosed systems can achieve improved user experience (e.g., more accuracy in textual descriptions of the video in comparison to conventional approaches).

As shown in diagram 1202, a content creator can upload videos to a video platform. After the raw video is processed by the task pipeline, a user can type in a natural language in the search bar of a user interface of the disclosed systems shown in diagram 1204 to initiate and complete a semantic video search of the uploaded videos. This process can enable the disclosed systems to allow the user to accurately search for particular moments inside a long video from a large video library and automatically locate the replay position inside the long videos. For example, as shown in block 1206, the user can enter a query "Steph Curry buzzer beater 3 pointer in NBA finals" that can direct the user to the exact replay location of the 3 pointer inside a 2-hour long recording of the first game of the Warriors-Cavalier 2018 NBA final series.

Figure 13:
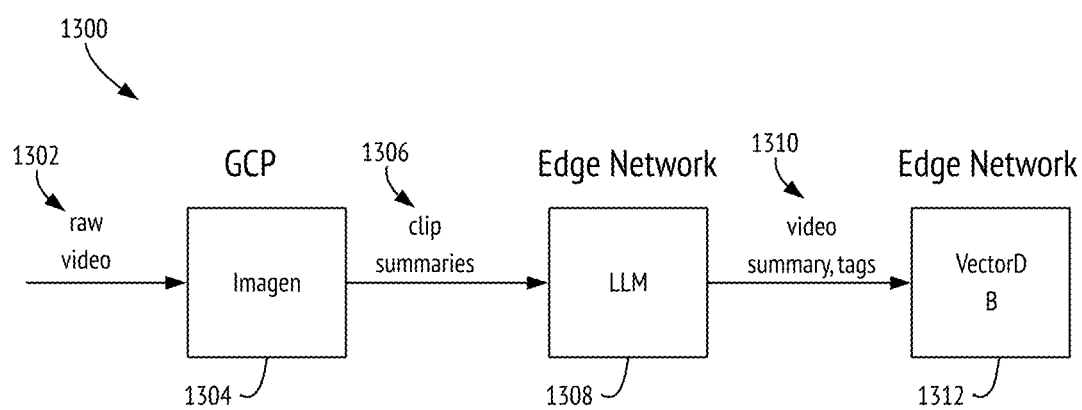
FIG. 13 shows an example implementation by the disclosed systems of a semantic video search using a task pipeline architecture, in accordance with example embodiments of the disclosure.

FIG. 13 shows an example implementation of a semantic video search using a task pipeline architecture, in accordance with example embodiments of the disclosure. In some respects, diagram 1300 shows the task pipeline for this use case can be consisted of three stages, with the video-to-text capability provided by a first computation task 1304 accessible via an API (e.g., a GOOGLE IMAGEN model via a VERTEXT AI API suite). The coordinator cluster of the hybrid cloud-edge platform may route the first computation task 1304 to be completed on a first network (e.g., the GOOGLE Cloud Platform (GCP)). The first computation task (e.g., the IMAGEN model) 1304 has as input a raw video 1302, and can output the summaries 1306 of 15-second clips of the video. Next, the coordinator cluster may route a second computation task 1308 (e.g., a large language model (LLM)) to be run in a second network (e.g., an edge network such as the THETA edge network) to generate tags and to collect the clip summaries 1306 to generate a higher level but still detailed summary 1310 of the entire video. The coordinator sends the second computation task data, which may include some or all of the output of the first computation task, to the second network, and then receives the output 1310 of the second computation task from the second network. The output 1310 may comprise embeddings of the tags, clip summaries, and a video summary, and can be stored by a database 1312 (e.g., a vector database) that can be hosted by the edge network. In some aspects, when a user types in a search in a natural language, the embedding of the query is computed in real time, which can then be matched against the tag/summary 1310 embedding stored in the vector database 1312 for the best video and the exact replay location for the query.

Figure 14:
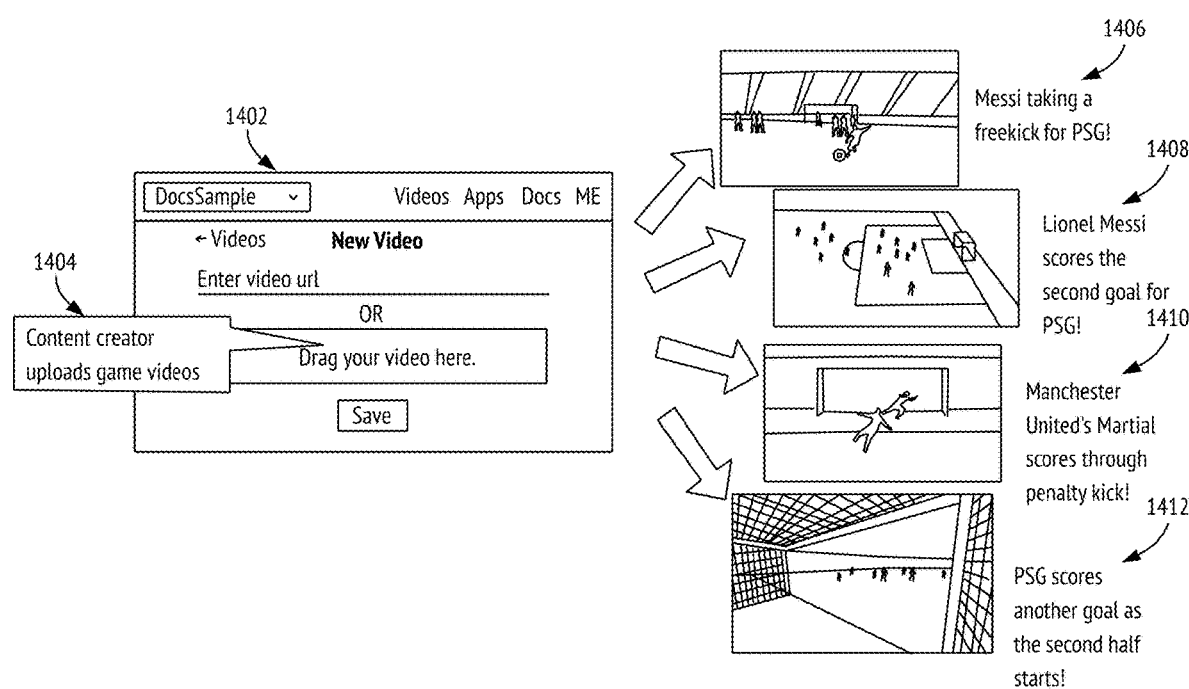
FIG. 14 shows an example of the disclosed systems using a task pipeline for another use case application for automatic game highlight reel generation, in accordance with the example embodiments of the disclosure.

FIG. 14 shows an example of the disclosed systems using a task pipeline for a second use case application in an automatic game highlight reel generation, in accordance with the example embodiments of the disclosure. This application can encompass not just extracting certain moments (e.g., exciting moments) from a game video stream, but can also include the disclosed systems generating natural language descriptions of the highlight clips. As shown in diagram 1402, a game streamer uploads game videos 1404 in a first graphical user interface of the disclosed systems. Then, the disclosed systems automatically generate various natural language descriptions associated with moments of the game video stream. For example, diagram 1406 shows a description of "Messi taking a freekick for PSG!" for a first moment of the game video stream, diagram 1408 shows a description of "Lionel Messi scores the second goal for PSG!" for a second moment of the game video stream, diagram 1410 shows a description of "Manchester United's Martial scores through penalty kick!" for a third moment of the game video stream, and diagram 1412 shows a description of "PSG scores another goal as the second half starts!" for a fourth moment of the game video stream.

Figure 15:
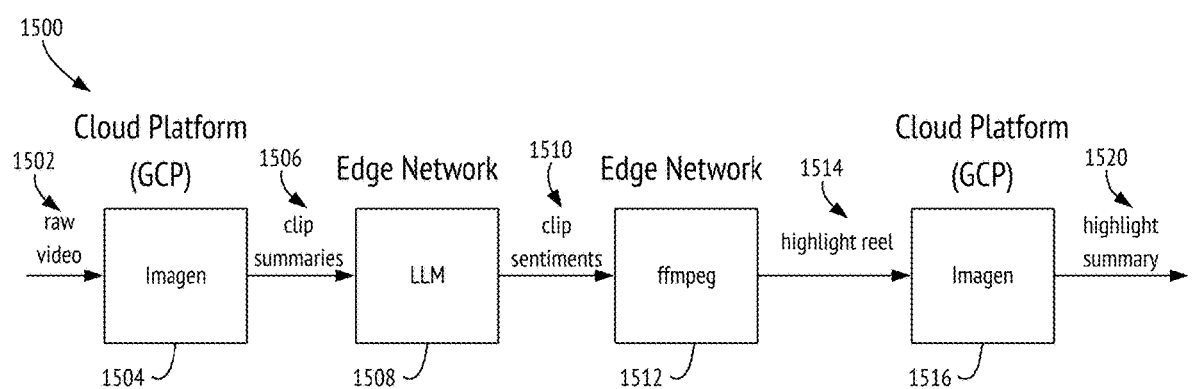
FIG. 15 shows another example implementation by the disclosed systems of the automatic game highlight reel generation using another task pipeline architecture, in accordance with example embodiments of the disclosure.

FIG. 15 shows an example implementation of an automatic game highlight reel generation using a task pipeline architecture, in accordance with example embodiments of the disclosure. As shown in diagram 1500, similar to the video semantic search case described above, the coordinator of the EdgeCloud platform may assign a first computation task (e.g., Imagen model) 1504 to run on a cloud-based network to extract clip summaries 1506 from the raw video 1502 uploaded by the game streamer. Next, the coordinator routes the outputted clip summaries 1506 and the data for a second computation task 1508 (e.g., an LLM) to be hosted and run by the edge network, which performs an analysis to generate clip sentiments 1510. Based on clip sentiments 1510, a score is assigned to each clip, where each score captures whether its associated clip has a highlight moment. Finally, the coordinator can feed the raw video 1502 and the begin/end time of the clips with top scores generated from the clip sentiments 1510 to a shard on the edge network (e.g., the THETA edge network), to run a software module 1512 (e.g., a FFMPEG software) to extract the clip highlights and combine them into a highlight reel 1514. Furthermore, the coordinator may feed the highlight reel 1514 and data for the fourth computation task back to the cloud network (e.g., GCP), which runs the Imagen model 1516 to create a natural language description such as a highlight summary 1520 of the highlight reel 1514, which may be used by the end users.

These examples of applications utilizing cloud and edge computing services together have broad implications for the execution of any suitable computational technique including, but not limited to, AI algorithms and machine learning.

By seamlessly switching between high-throughput and high-availability centralized services like GCP along with decentralized edge networks like THETA with massive parallel processing power, developers and enterprises can always have the best tool for computing a workload instead of compromising on one versus the other. Further, with video comprising a relatively large portion (e.g., 80%) of global network traffic and growing, these video-focused use cases will be a major component of production AI use cases in the coming years.

Exemplary Flow of Operations

Figure 16:
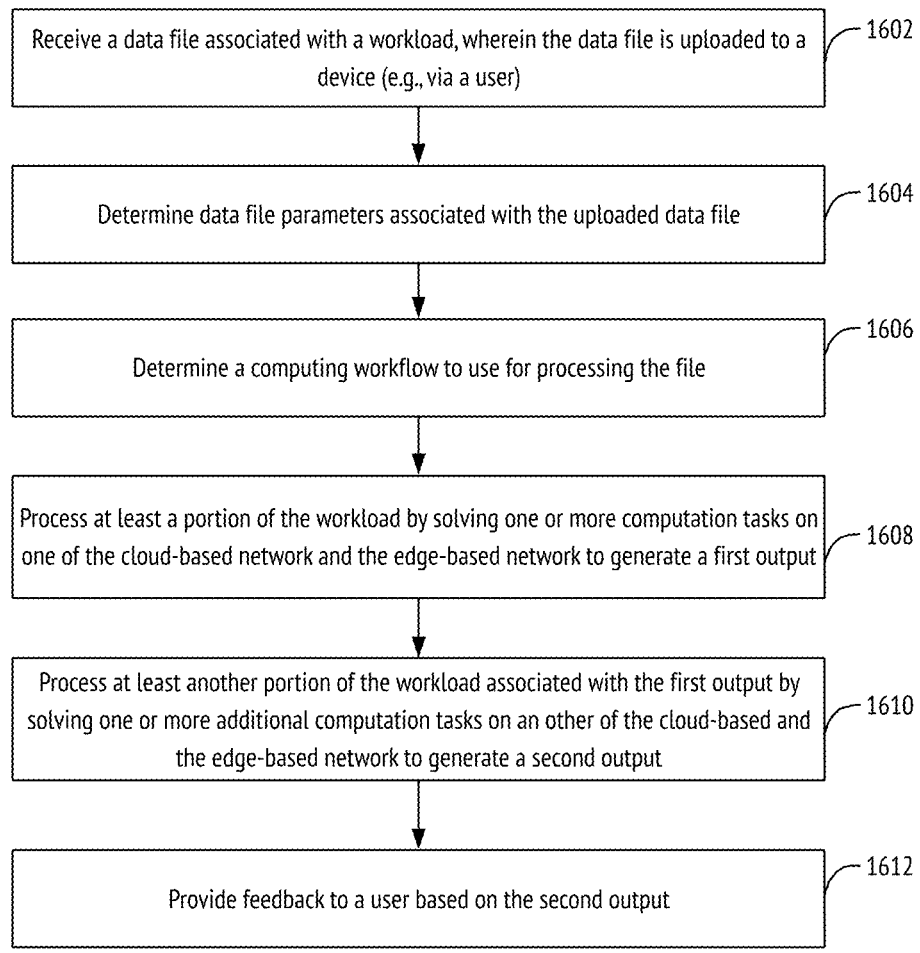
FIG. 16 shows a flowchart diagram for example operations for hybrid cloud-edge computing using decentralized networks associated with the disclosed systems, in accordance with example embodiments of the disclosure.

FIG. 16 shows an example flowchart diagram for hybrid cloud-edge based computing, to increase the efficiency of any suitable computational technique including, but not limited to, AI algorithms and machine learning. At block 1602, a data file associated with a workload, which may comprise one or more tasks, is received by coordinator cluster of the EdgeCloud platform, where the data file has been uploaded to a device (e.g., by a user through a user-facing dashboard or an API for developers). The data file can be in any suitable format, including but not limited to, a video file, an audio file, a text file, a numerical file, and/or the like. The data file may include one or more generic containerized compute tasks. The data file can be uploaded via a corresponding user interface associated with a software-based module, and received at a device. The software-based module can include a cloud-based module, an edge-based module, or a local user-device stored software module that is communicatively coupled to a cloud or an edge network. At block 1604, the coordinator cluster of the disclosed systems determines data file parameters associated with the uploaded data file. The data file parameters can include, but not be limited to, a file type, a metadata associated with the file, a security characteristic associated with the file, an owner of the file, a timestamp associated with the data file, a job type to be performed using the file, resource requirements, and SLAs. At block 1606, the coordinator cluster of the disclosed systems can determine a computing workflow to use for processing the data file and associated tasks. The computing workflow may include a selection of shards of cloud-based or edge-based nodes and an assignment of tasks in the workload to shards and worker nodes within the shards, based on computed efficiency scores. In some aspects, the computing architecture can be determined based at least in part on the data file parameters and the workload. In other aspects, a user can select or modify the computing workflow to be used for processing. In some aspects, the computing workflow can include at least one cloud-based computing network and at least one edge-based computing network. The edge-based computing network can include a decentralized blockchain-based network (e.g., a THETA Edge Network). At block 1608, the disclosed systems can process at least a portion of the workload using one or more computation tasks on one of the cloud-based network and the edge-based network according to the computing workflow determined by the coordinator cluster to generate a first output. In some aspects, the one or more computation tasks can include any suitable machine learning model, AI-based model, or computational algorithm. At block 1610, the disclosed systems can process at least another portion of the workload associated with the first output using one or more additional computation tasks on an other of the cloud-based network and the edge-based network, according to the computing workflow determined by the coordinator cluster, to generate a second output. In some aspects, the one or more additional computation tasks can include any suitable machine learning model, AI-based model, or computational algorithm. In some aspects, data, such as intermediate input and output data, may be transferred between nodes hosting different models through a peer-to-peer network, a shared storage system, or other data transfer means. In some aspects, the coordinator manages the data flow between nodes running different tasks or hosting different models within the workload. At block 1612, the coordinator cluster of the disclosed systems can provide feedback to a user based on the second output. In some examples, the feedback can include a workload completion status, a cryptocurrency associated with the processing of the workload, an owner of the workload, a status of the workload, an identifier associated with the workload, combinations thereof, and/or the like.

Exemplary EdgeCloud Platform User Interface with AI Applications

Figure 17:
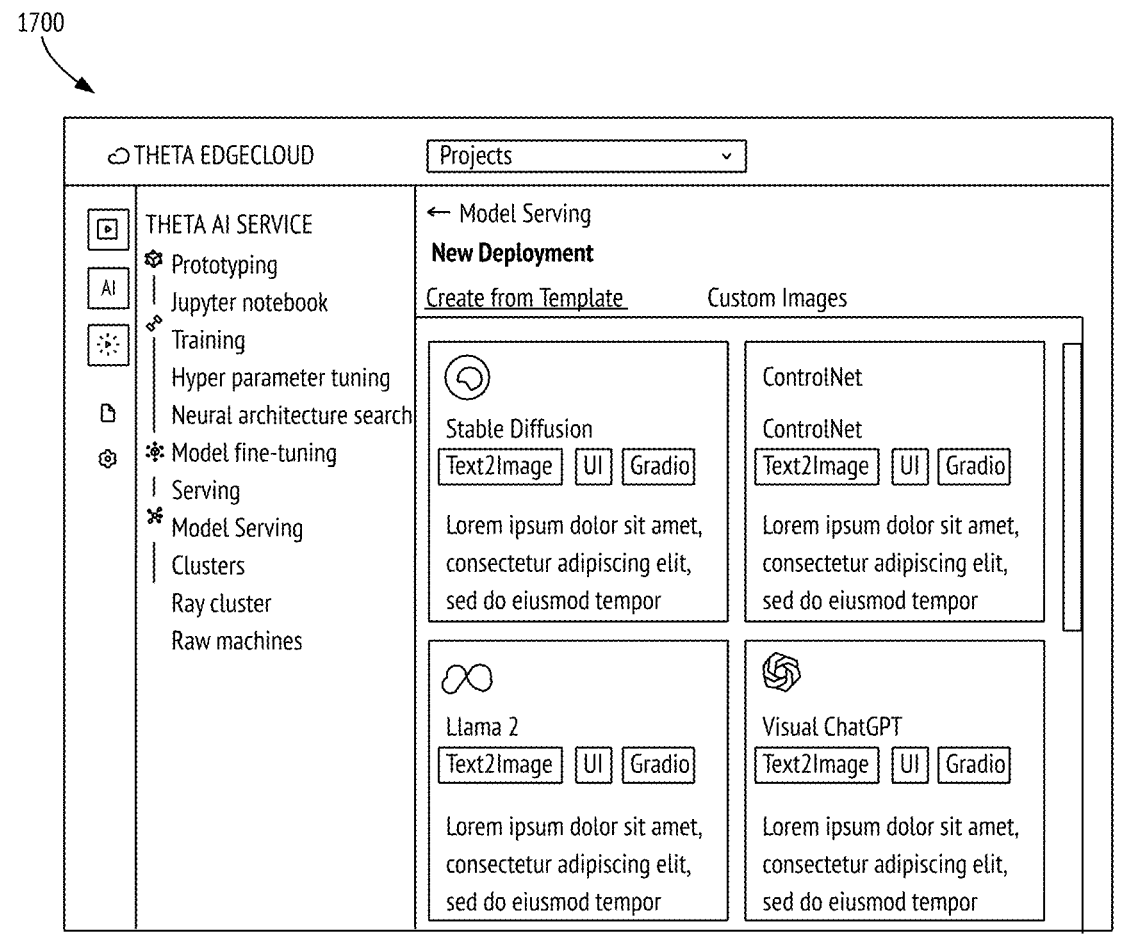

FIG. 17 shows an example user interface 1700 for selecting and deploying AI models on the hybrid cloud-edge platform. AI developers using the hybrid cloud-edge computing platform can easily select and deploy popular AI models such as Stable Diffusion, Llama 2, and other off-the-shelf models with just a few clicks and build their AI powered apps on top. These AI powered apps can be configured to be trained and deployed efficiently on the EdgeCloud platform.

Figure 19:
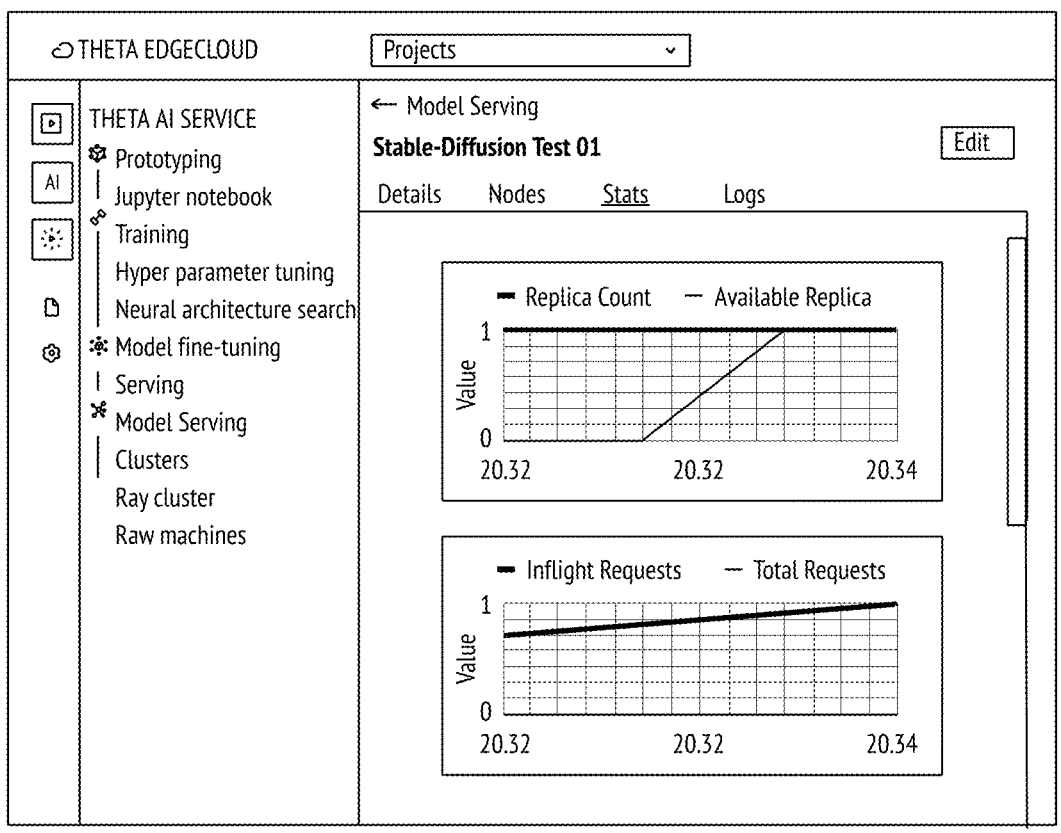
FIG. 19 shows an example user interface for tracking a user's AI development pipeline on the hybrid cloud-edge platform.

FIG. 18 shows an example user interface 1800 for managing a user's AI development pipeline on the hybrid cloud-edge platform. AI developers using the hybrid cloud-edge computing platform may manage their entire AI pipeline development, which may include prototyping using JUPYTER notebook, to training AI models, including hyperparameter tuning and neural architecture search, as well as fine-tuning AI models. Users may specify AI models or any containerized tasks to be run in the Source field 1810. Users may select the GPU models and counts in the GPU selection fields 1820. The EdgeCloud platform can easily deploy and serve a user's AI models across a network of GPUs in the EdgeCloud platform, which provides optimized, immediately accessible, and scalable access to the GPUs. AI models can also be specified to run on ray clusters or raw machines within the EdgeCloud platform. FIG. 19 shows an example user interface 1900 for tracking a user's AI development pipeline on the hybrid cloud-edge platform. In this example, a user is running a Stable Diffusion AI model and can view the stats of its deployment within the EdgeCloud platform in the Stats tab of the user interface.

Additional Details Regarding Use of AI and Routing

In some aspects, the computing components shown and described above may use artificial intelligence (AI) (e.g., the machine learning components shown and described above in connection with the above figures) to process the contents of the data to generate results and/or to determine the processing of workloads within the portions of a network architecture, for example, by monitoring data flow over different portions of the network over time (e.g., historical data) for enhanced workload routing. Accordingly, embodiments of devices, the management computing entity, and/or related components described herein can employ AI to facilitate automating one or more features described herein. The components can employ various AI-based schemes for carrying out various embodiments/examples disclosed herein. To provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether the events are correlated in close temporal proximity, and whether the events and data come from one or several event and data sources. Components disclosed herein can employ various classification schemes, including explicitly trained (e.g., via training data) as well as implicitly trained (e.g., via observing behavior, preferences, historical information, receiving extrinsic information, etc.), and/or systems (e.g., support vector machines, neural networks, expert systems, Bayesian belief networks, fuzzy logic, data fusion engines, etc.) in connection with performing automatic and/or determined actions in connection with the claimed subject matter. Thus, classification schemes and/or systems can be used to automatically learn and perform a number of functions, actions, and/or determinations. In some aspects, the neural network can include, but not be limited to, at least one of a long short term memory (LSTM) neural network, a recurrent neural network, a time delay neural network, or a feed forward neural network.

A classifier can map an input attribute vector, $z=(z1, z2, z3, z4, \ldots, zn)$, to a confidence that the input belongs to a class, as by $f(z)=$confidence (class). Such classification can employ a probabilistic and/or statistical-based analysis to determine an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

In some embodiments, the disclosed systems can include routing components that can further include a component that determines to transmit workloads and/or associated data to different portions of the networks. In some aspects, the routing component may base the transmissions on the distributions determined by the modeling and/or machine learning techniques variously described herein to route the transmission accordingly. In some embodiments, the routing component can encapsulate the packets associated with appropriate header and/or metadata information to transmit them to different portions of the network (e.g., a wireless portion of the network or a wired portions of the network). In some examples, the routing component and/or edge computing nodes can throttle at least one of (1) a transmission rate associated with data traffic to and from the cloud network, (2) a transmission rate associated with data traffic to and from the edge network, (3) a transmission rate associated with data traffic to and from a device associated with the cloud network, or (4) a transmission rate associated with data traffic to and from a device associated with edge network, based on the difference between a first programmatically expected latency associated with the cloud network or a second programmatically expected latency associated with the edge network.

Machine Learning (ML) and Neural Networks

Machine learning (ML) algorithms are characterized by the ability to improve their performance at a task over time without being explicitly programmed with the rules to perform that task (i.e., learn). A machine learning (ML) model is the output generated when a ML algorithm is trained on data. As described herein, embodiments of the present invention execute and/or train one or more artificial intelligence (AI) and machine learning (ML) algorithms using the hybrid cloud-edge computing platform. Various exemplary ML algorithms are within the scope of the present invention. The following description describes illustrative ML techniques for implementing various embodiments of the present invention.

Neural Networks

Figure 20:
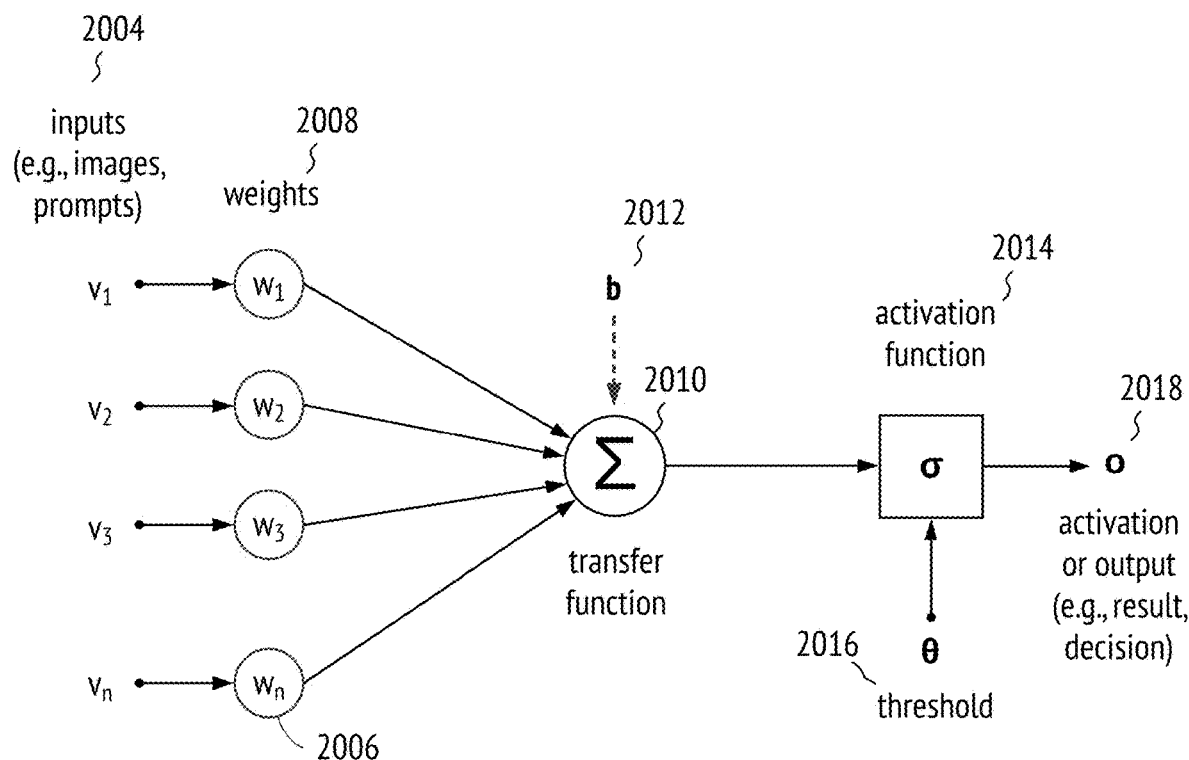
FIG. 20 describes a fundamental neural network operation as it relates to hybrid cloud-edge computing in a cloud-edge computing platform, according to exemplary embodiments of the present invention.

A neural network is a computational model inspired by the structure of the human brain, consisting of interconnected units called neurons that work together to process information. It is a type of ML algorithm that is particularly effective for recognizing patterns and making predictions based on complex data. Neural networks are widely used in various applications such as image and speech recognition and natural language processing, due to their ability to learn from large amounts of data and improve their performance over time. FIG. 20 describes a fundamental neural network operation as it relates to hybrid cloud-edge computing in a cloud-edge computing platform, according to exemplary embodiments of the present invention.

FIG. 20 shows a single-layered neural network, also known as a single-layer perceptron. Such a perceptron is the building block for neural networking layers that may be used for hybrid cloud-edge computing in a cloud-edge computing platform, according to embodiments of the present invention. The operation of a single-layered neural network involves the following steps:

1. Input: Receiving an input vector v 2004 with elements $v_j$, with $j \in [1, n]$ representing the $j^{th}$ input, and where each element of the vector corresponds to a neuron 2006 in the input layer. In an exemplary ML or AI model deployed on the hybrid cloud-edge platform, the input vector may be videos, images, text, documents, code, or a user prompt, as described in the present disclosure.

2. Transfer Function: Multiplying each input by a corresponding weight $w_j$ 2008. These weighted inputs are then summed together as the transfer function, yielding the net input to the activation function $\Sigma_{j=1}^{n} v_j \cdot w_j$ 2010.

Each neuron in a neural network may have a bias value b 2012, which is added to the weighted sum of the inputs to that neuron. Both the weights and bias values are learned during the training process. The purpose of the bias is to provide every neuron with a trainable constant value that can help the model fit the data better. With biases, the net input to the activation function is $\Sigma_{j=1}^{n} \{v_j \cdot w_j\} + b$.

3. Activation Function: Passing the net input through an activation function 2014. The activation function σ determines the activation value o 2018, which is the output of the neuron. It is typically a non-linear function such as a sigmoid or ReLU (Rectified Linear Unit) function. The threshold θ 2016 of the activation function is a value that determines whether a neuron is activated or not. In some activation functions, such as the step function, the threshold is a specific value. If the net input is above the threshold, the neuron outputs a constant value, and if it's below the threshold, it outputs a zero value. In other activation functions, such as the sigmoid or ReLU (Rectified Linear Unit) functions, the threshold is not a specific value but rather a point of transition in the function's curve.

4. Output: The activation value o 2018 is the output of the activation function. This value is what gets passed on to the next layer in the network or becomes the final output in the case of the last layer. In an exemplary neural network model deployed on the hybrid cloud-edge platform, the final output of the neural network may be an embedding or context vector representing an analysis result, or a decision boolean variable.

Figure 21:
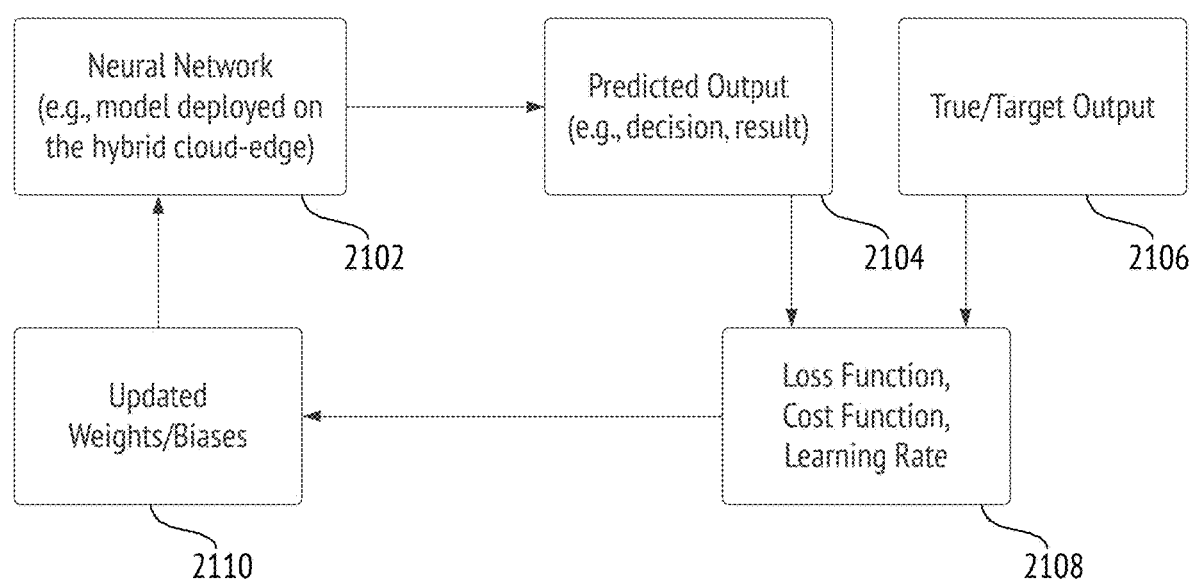
FIG. 21 shows an overview of the neural network training process that can be used for hybrid cloud-edge computing in a cloud-edge computing platform, according to exemplary embodiments of the present invention.

FIG. 21 shows an overview of the neural network training process that can be deployed on a hybrid cloud-edge platform, according to exemplary embodiments of the present invention.

In a hybrid cloud-edge platform, the neural network 2102 undergoing the training may be a deployed AI model, as described in the present disclosure. The training of a neural network involves repeatedly updating the weights and biases 2110 of the network to minimize the difference between the predicted output 2104 and the true or target output 2106, where the predicted output 2104 is the result produced by the network when a set of inputs from a dataset is passed through it. The true or target output 2106 is the true desired result. The difference between the predicted output and the true output is calculated using a loss function 2108, which quantifies the error made by the network in its predictions. In an exemplary neural network model deployed on the hybrid cloud-edge platform, the predicted 2104 and true/target outputs 2106 of the neural network may be an embedding or context vector representing a result, or a decision boolean variable.

The loss function is a part of the cost function 2108, which is a measure of how well the network is performing over the whole dataset. The goal of training is to minimize the cost function 2108. This is achieved by iteratively adjusting the weights and biases 2110 of the network in the direction that leads to the steepest descent in the cost function. The size of these adjustments is determined by the learning rate 2108, a hyperparameter that controls how much the weights and biases change in each iteration. A smaller learning rate means smaller changes and a slower convergence towards the minimum of the cost function, while a larger learning rate means larger changes and a faster convergence, but with the risk of overshooting the minimum.

Neural network training combines the processes of forward propagation and backpropagation. Forward propagation is the process where the input data is passed through the network from the input layer to the output layer. During forward propagation, the weights and biases of the network are used to calculate the output for a given input. Backpropagation, on the other hand, is the process used to update the weights and biases 2110 of the network based on the error (e.g., cost function) 2108 of the output. After forward propagation through neural network 2102, the output 2104 of the network is compared with true output 2106, and the error 2108 is calculated. This error is then propagated back through the network, starting from the output layer and moving towards the input layer. The weights and biases 2110 are adjusted in a way that minimizes this error. This process is repeated for multiple iterations or epochs until the network is able to make accurate predictions.

The neural network training method described above, in which the network is trained on a labeled dataset (e.g., sample pairs of input user prompts and corresponding output recommendations), where the true outputs are known, is called supervised learning. In unsupervised learning, the network is trained on an unlabeled dataset, and the goal is to discover hidden patterns or structures in the data. The network is not provided with the true outputs, and the training is based on the intrinsic properties of the data. Furthermore, reinforcement learning is a type of learning where an agent learns to make decisions from the rewards or punishments it receives based on its actions. Although reinforcement learning does not typically rely on a pre-existing dataset, some forms of reinforcement learning can use a database of past actions, states, and rewards during the learning process. Any neural network training method that uses a labeled dataset is within the scope of the methods and systems described herein, as is clear from the overview below.

Transformer Model Architecture

The transformer architecture, which is used by the AI models depicted in FIGS. 17-19, including but not limited to Stable Diffusion, ControlNet, Llama 2, and Visual ChatGPT, is a neural network design that was introduced in the paper "Attention is All You Need" by Vaswani et al. (available at https://arxiv.org/abs/1706.03762) published in June 2017, and incorporated herein by reference as if fully set forth herein. Large Language Models (LLMs) heavily rely on the transformer architecture.

The architecture (see FIG. 1 of the referenced paper) is based on the concept of "attention," allowing the model to focus on different parts of the input sequence when producing an output. Transformers consist of an encoder and a decoder. The encoder processes the input data and the decoder generates the output. Each of these components is made up of multiple layers of self-attention and point-wise, fully connected layers.

The layers of self-attention in the transformer model allow it to weigh the relevance of different parts of the input sequence when generating an output, thereby enabling it to capture long-range dependencies in the data. On the other hand, the fully connected layers are used for transforming the output of the self-attention layers, adding complexity and depth to the model's learning capability.

The transformer model is known for its ability to handle long sequences of data, making it particularly effective for tasks such as machine translation and text summarization. In the transformer architecture, positional encoding is used to give the model information about the relative positions of the words in the input sequence. Since the model itself does not have any inherent sense of order or sequence, positional encoding is a way to inject some order information into the otherwise order-agnostic attention mechanism.

The Embeddings Vector Space

In the context of neural networks, tokenization refers to the process of converting the input and output spaces, such as natural language text or programming code, into discrete units or "tokens." This process allows the network to effectively process and understand the data, as it transforms complex structures into manageable, individual elements that the model can learn from and generate.

In the training of neural networks, embeddings serve as a form of distributed word representation that converts discrete categorical variables (i.e., tokens) into a continuous vector space (i.e., embedding vectors). This conversion process captures the semantic properties of tokens, enabling tokens with similar meanings to have similar embeddings. These embeddings provide a dense representation of tokens and their semantic relationships. Embeddings are typically represented as vectors, but may also be represented as matrices or tensors.

The input of a transformer typically requires conversion from an input space (e.g., the natural language token space) to an embeddings space. This process, referred to as "encoding," transforms discrete inputs (tokens) into continuous vector representations (embeddings). This conversion is a prerequisite for the transformer model to process the input data and understand the semantic relationships between tokens (e.g., words). Similarly, the output of a transformer typically requires conversion from the embeddings space to an output space (e.g., natural language tokens, programming code tokens, etc.), in a process referred to as "decoding." Therefore, the training of a neural network and its evaluation (i.e., its use upon deployment) both occur within the embeddings space.

In the remainder of this document, the processes of tokenization, encoding, decoding, and detokenization are assumed. In other words, the processes described below occur in the "embeddings space." Hence, while the tokenization and encoding of training data and input prompts may not be represented or discussed explicitly, they are implied. Similarly, the decoding and detokenization of neural network outputs is also implied.

Training and Fine-Tuning Machine Learning (ML) Modules

Figure 22:
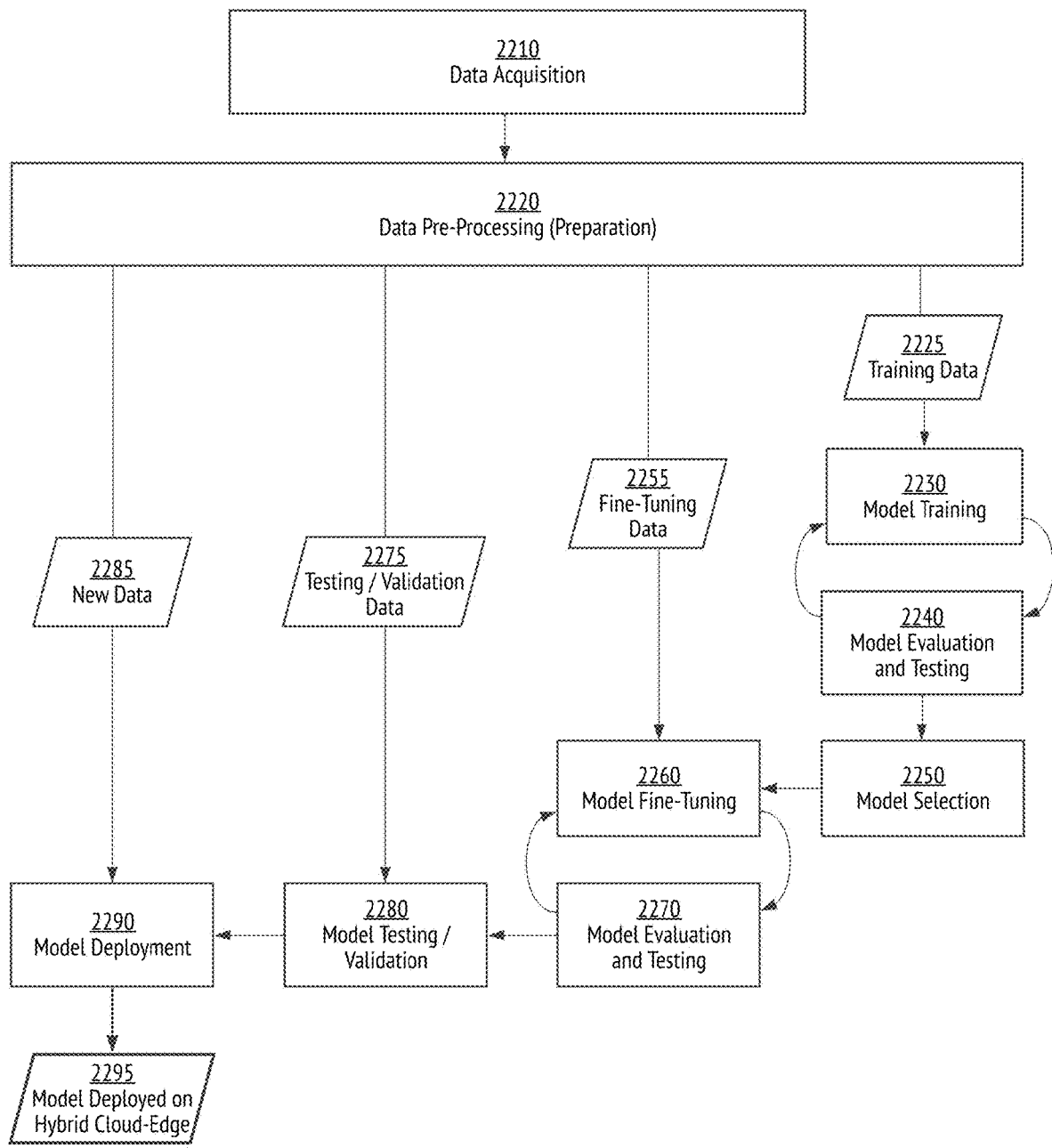
FIG. 22 is an illustrative flow diagram showing the different phases and datasets involved in training and deploying a machine learning algorithm for hybrid cloud-edge computing in a cloud-edge computing platform, according to exemplary embodiments of the present invention.

FIG. 22 is an illustrative flow diagram showing the different phases and datasets involved in training and deploying a machine learning model on a hybrid cloud-edge computing platform, according to exemplary embodiments of the present invention.

The training process begins at step 2210 with the acquisition, retrieval, assimilation, or generation of data related to the machine learning application. At step 2220, acquired data are pre-processed, or prepared. At step 2230, the ML model (e.g., an exemplary LLM deployed on the hybrid cloud-edge platform) is trained using training data 2225. At step 2240, the ML model is evaluated, validated, and tested, and further refinements to the ML model are fed back into step 2230 for additional training. Once its performance is acceptable, at step 2250, optimal model parameters are selected.

Training data 2225 is a documented data set containing multiple instances of system inputs and correct outcomes. It trains the ML model to optimize the performance for a specific target task. In FIG. 22, training data 2225 may also include subsets for validating and testing the ML model, as part of the training iterations 2230 and 2240. For an NN-based ML model, the quality of the output may depend on (a) NN architecture design and hyperparameter configurations, (b) NN coefficient or parameter optimization, and (c) quality of the training data set. These components may be refined and optimized using various methods. For example, training data 2825 may be expanded via an augmentation process.

In some embodiments, an additional fine-tuning 2260 phase including iterative fine-tuning 2260 and evaluation, validation, and testing 2270 steps, is carried out using fine-tuning data 2255. Fine-tuning in machine learning is a process that involves taking a selected 2250 pre-trained model and further adjusting or "tuning" its parameters to better suit a specific task or fine-tuning dataset 2255. This technique is particularly useful when dealing with deep learning models that have been trained on large, general training datasets 2225 and are intended to be applied to more specialized tasks or smaller datasets. The objective is to leverage the knowledge the model has already acquired during its initial training (often referred to as transfer learning) and refine it so that the model performs better on a more specific task at hand.

The fine-tuning process typically starts with a model that has already been trained on a large benchmark training dataset 2225, such as ImageNet for image recognition tasks. The model's existing weights, which have been learned from the original training, serve as the starting point. During fine-tuning, the model is trained further on a new fine-tuning dataset 2255, which may contain different classes or types of data than the original training set. This additional training phase allows the model to adjust its weights to better capture the characteristics of the new fine-tuning dataset 2255, thereby improving its performance on the specific task it is being fine-tuned for.

In some embodiments, additional test and validation 2280 phases are carried out using test and validation data 2275. Testing and validation of a ML model both refer to the process of evaluating the model's performance on a separate dataset 2275 that was not used during training, to ensure that it generalizes well to new unseen data. Validation of a ML model helps to prevent overfitting by ensuring that the model's performance generalizes beyond the training data.

While the validation phase is considered part of ML model development and may lead to further rounds of fine-tuning, the testing phase is the final evaluation of the model's performance after the model has been trained and validated. The testing phase provides an unbiased assessment of the final model's performance that reflects how well the model is expected to perform on unseen data, and is usually carried out after the model has been finalized to ensure the evaluation is unbiased.

Once the model is trained 2230, selected 2250, and optionally fine-tuned 2260 and validated/tested 2280, it is deployed 2290. Deployed ML models (e.g., neural network models deployed on the hybrid cloud-edge platform) 2295 usually receive new data 2285 that was pre-processed 2220.

In machine learning, data pre-processing 2220 is tailored to the phase of model development. During model training 2230, pre-processing involves cleaning, normalizing, and transforming raw data into a format suitable for learning patterns. For fine-tuning 2260, pre-processing adapts the data to align with the distribution of the specific targeted task, ensuring the pre-trained model can effectively transfer its knowledge. Validation 2280 pre-processing mirrors that of training to accurately assess model generalization without leakage of information from the training set. Finally, in deployment (2290 and 2295), pre-processing ensures real-world data matches the trained model's expectations, often involving dynamic adjustments to maintain consistency with the training and validation stages.

In various embodiments of the present invention, the data pre-processing step 2220, model training step 2230, model evaluation and testing step 2240, model selection step 2250, model fine-tuning step 2260, model evaluation and testing step 2270, model testing and validation step 2280, and model deployment step 2290 may be completed on the hybrid cloud-edge computing platform. The steps may be completed as different tasks or as part of a larger multi-step task that is coordinated by the coordinator cluster. In some embodiments, the steps may be assigned to be run on one or more cloud-based networks, one or more edge networks such as the blockchain-supported and incentivized THETA Edge Network, or a combination of cloud and edge networks as described in the present disclosure.

Machine Learning Algorithms

Various exemplary ML algorithms are within the scope of the present invention. Such machine learning algorithms include, but are not limited to, random forest, nearest neighbor, decision trees, support vector machines (SVM), Adaboost, gradient boosting, Bayesian networks, evolutionary algorithms, various neural networks (including deep learning networks (DLN), convolutional neural networks (CNN), and recurrent neural networks (RNN)), etc.

ML modules based on transformers and Large Language Models (LLMs) are particularly well suited for the tasks described herein. The online article "*Understanding Large Language Models—A Transformative Reading List*," by S. Raschka (posted Feb. 7, 2023, available at https://sebastian-raschka.com/blog/2023/llm-reading-list.html), describes various LLM architectures that are within the scope of the methods and systems described herein, and is hereby incorporated by reference in its entirety herein as if fully set forth herein.

The input to each of the listed ML modules is a feature vector comprising the input data described above for each ML module. The output of the ML module is a feature vector comprising the corresponding output data described above for each ML module.

Prior to deployment, each of the ML modules listed above may be trained on one or more respective sample input datasets and on one or more corresponding sample output datasets. The input and output training datasets may be generated from a database containing a history of input instances and output instances, or may be generated synthetically by subject matter experts.

Implementation Using Computer Program Products, Methods, and Computing Entities

Exemplary System Architecture

Figure 23:
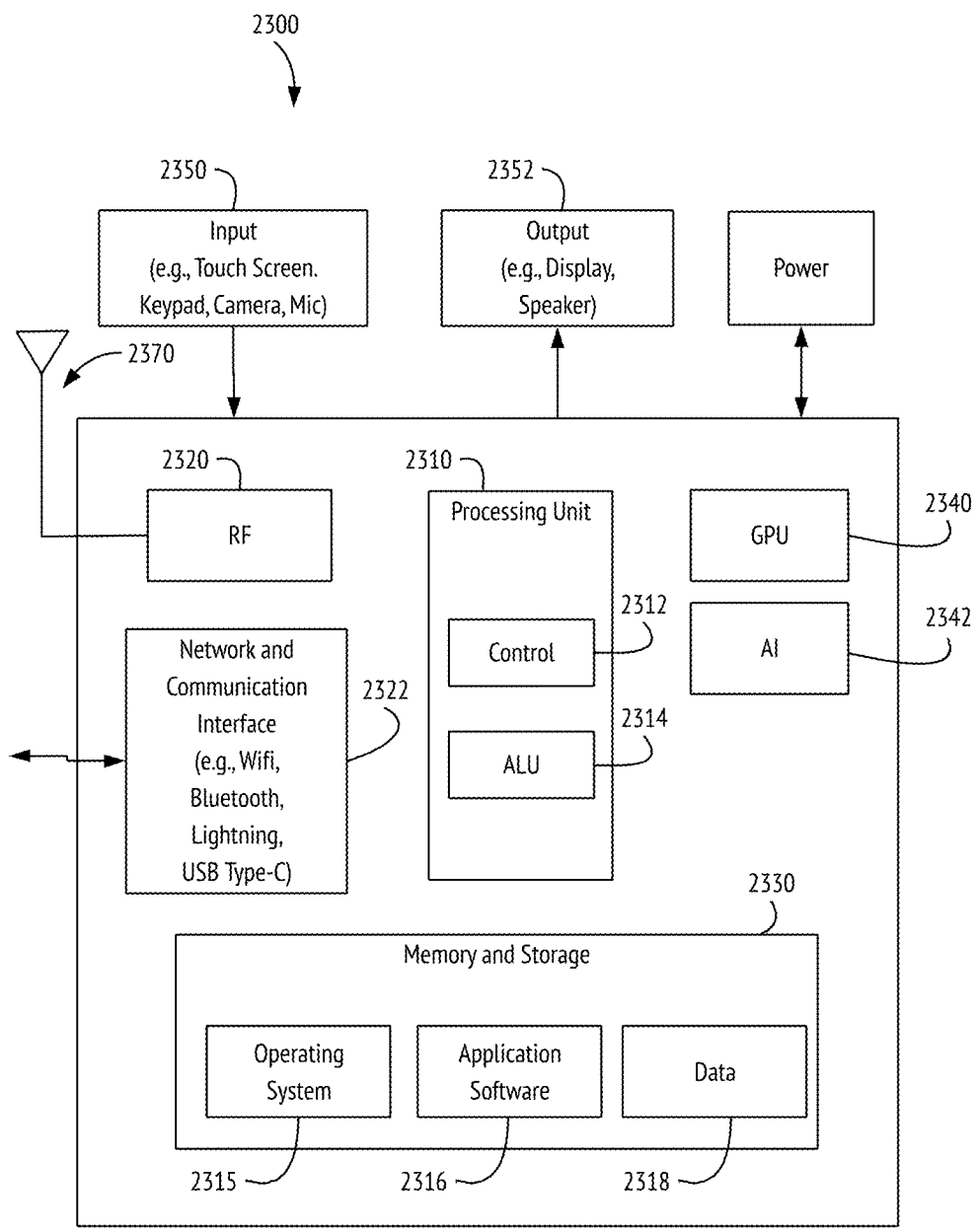
FIG. 23 shows an example schematic diagram of a user computing entity for implementing a hybrid cloud-edge computing platform, according to example embodiments of the disclosure.
Figure 24:
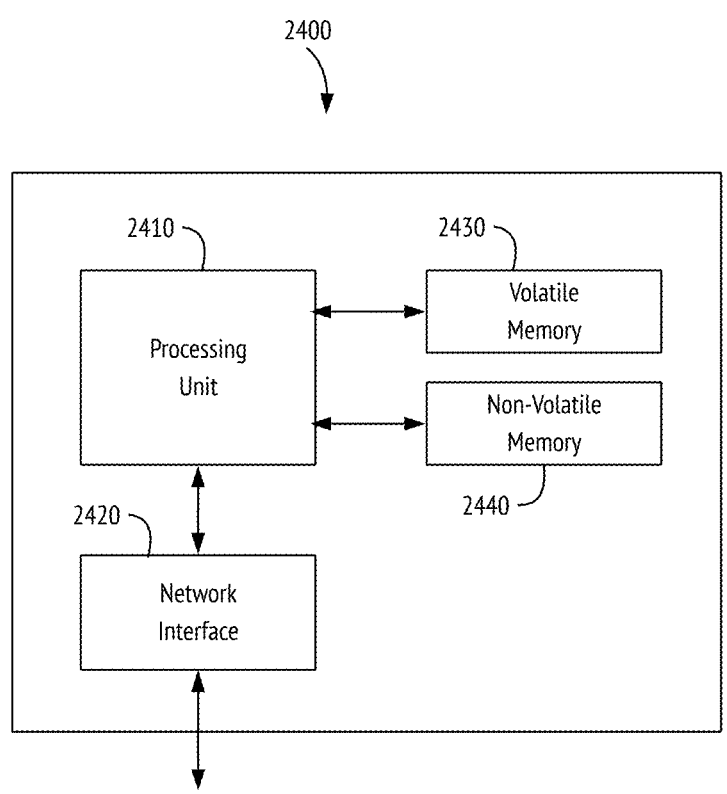
FIG. 24 shows an exemplary schematic diagram of a management computing entity for implementing a server node used for decentralized storage and computing via hybrid cloud-edge computing, according to example embodiments of the disclosure.

An exemplary embodiment of the present disclosure may include one or more end user computing entities 2300, blockchain nodes, or other management computing entities 2400, as shown in FIGS. 23 and 24. Each of these components, entities, devices, systems, and similar words used herein interchangeably may be in direct or indirect communication with, for example, one another over the same or different wired or wireless networks. Additionally, while FIGS. 23 and 24 illustrate the various system entities as separate, standalone entities, the various embodiments are not limited to this particular architecture. Both user computing entity 2300 and management computing entity 2400 may be implemented using similar, or even identical, hardware elements.

Exemplary User Computing Entity

FIG. 23 is an exemplary schematic diagram of a user computing entity for implementing a peer node such as an edge computing node, according to exemplary embodiments of the present invention. An end user computing device 2300 capable of performing a computation task includes one or more components as shown. As will be recognized, these architectures and descriptions are provided for exemplary purposes only and are not limited to the various embodiments.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, Internet of Things (IoT) devices, radio frequency identification (RFID) tags, car pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, monitoring, evaluating, comparing, and/or similar terms used herein interchangeably. In various embodiments, these functions, operations, and/or processes can be performed on data, content, information, and/or similar terms used herein interchangeably. On the other hand, a task initiator/server, a tracker server, or payment server may be implemented according to the exemplary schematic diagram shown in FIG. 24, possibly in the cloud, and possibly with logically or physically distributed architectures.

As shown in FIG. 23, user computing entity 2300 may include an antenna 2370, a radio transceiver 2320, and a processing unit 2310 that provides signals to and receives signals from the transceiver. The signals provided to and received from the transceiver may include signaling information in accordance with air interface standards of applicable wireless systems. In this regard, user computing entity 2300 may be capable of operating with one or more air interface standards, communication protocols, modulation types, and access types. More particularly, user computing entity 2300 may operate in accordance with any of a number of wireless communication standards and protocols. In some embodiments, user computing entity 2300 may operate in accordance with multiple wireless communication standards and protocols, such as 5G, UMTS, FDM, OFDM, TDM, TDMA, E-TDMA, GPRS, extended GPRS, CDMA, CDMA2000, 1xRTT, WCDMA, TD-SCDMA, GSM, LTE, LTE advanced, EDGE, E-UTRAN, EVDO, HSPA, HSDPA, MDM, DMT, Wi-Fi, Wi-Fi Direct, WiMAX, UWB, IR, NFC, ZigBee, Wibree, Bluetooth, and/or the like. Similarly, user computing entity 2300 may operate in accordance with multiple wired communication standards and protocols, via a network and communication interface 2322.

Via these communication standards and protocols, user computing entity 2300 can communicate with various other computing entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). User computing entity 2300 can also download changes, add-ons, and updates, for instance, to its firmware, software (e.g., including executable instructions, applications, program modules), and operating system.

In some implementations, processing unit 2310 may be embodied in several different ways. For example, processing unit 2310 may be embodied as one or more complex programmable logic devices (CPLDs), microprocessors, multi-core processors, coprocessing entities, application-specific instruction-set processors (ASIPs), microcontrollers, and/or controllers. Further, the processing unit may be embodied as one or more other processing devices or circuitry. The term circuitry may refer to an entirely hardware embodiment or a combination of hardware and computer program products. Thus, processing unit 2310 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 2310 may be configured for a particular use or configured to execute instructions stored in volatile or non-volatile media or otherwise accessible to the processing unit. As such, whether configured by hardware or computer program products, or by a combination thereof, processing unit 2310 may be capable of performing steps or operations according to embodiments of the present invention when configured accordingly.

In some embodiments, processing unit 2310 may comprise a control unit 2312 and a dedicated arithmetic logic unit 2314 (ALU) to perform arithmetic and logic operations. In some embodiments, user computing entity 2300 may comprise a graphics processing unit 2340 (GPU) for specialized image and video rendering tasks, and/or an artificial intelligence (AI) accelerator 2342, specialized for applications including artificial neural networks, machine vision, and machine learning. In some embodiments, processing unit 2310 may be coupled with GPU 2340 and/or AI accelerator 2342 to distribute and coordinate processing tasks.

In some embodiments, user computing entity 2300 may include a user interface, comprising an input interface 2350 and an output interface 2352, each coupled to processing unit 2310. User input interface 2350 may comprise any of a number of devices or interfaces allowing the user computing entity 2300 to receive data, such as a keypad (hard or soft), a touch display, a mic for voice/speech, and a camera for motion or posture interfaces. User output interface 2352 may comprise any of a number of devices or interfaces allowing user computing entity 2300 to provide content and information to a user, such as through a touch display, or a speaker for audio outputs. In some embodiments, output interface 2352 may connect user computing entity 2300 to an external loudspeaker or projector, for audio or visual output.

User computing entity 2300 may also include volatile and/or non-volatile storage or memory 2330, which can be embedded and/or may be removable. A non-volatile memory may be ROM, PROM, EPROM, EEPROM, flash memory, MMCs, SD memory cards, Memory Sticks, CBRAM, PRAM, FcRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store an operating system 2315, application software 2316, data 2318, databases, database instances, database management systems, programs, program modules, SDKs, scripts, source code, object code, byte code, compiled code, interpreted code, machine code, executable instructions, and/or the like to implement the functions of user computing entity 2300. As indicated, this may include a user application that is resident on the entity or accessible through a browser or other user interface for communicating with a management computing entity and/or various other computing entities.

In some embodiments, user computing entity 2300 may include location determining aspects, devices, modules, functionalities, and/or similar words used herein interchangeably. For example, user computing entity 2300 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites. Alternatively, the location information may be determined by triangulating the user computing entity's position in connection with a variety of other systems, including cellular towers, Wi-Fi access points, and/or the like. Similarly, user computing entity 2300 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters. Location information thus obtained may be used in determining nearby peers for data distribution and retrieval.

In some embodiments, two or more users may establish a connection between their computing devices using any of the networking protocols listed previously, and any peer-to-peer protocols including BitTorrent, or that provided by the THETA network. In some embodiments, the user computing devices may use a network interface such as 2322 to communicate with various other computing entities, to exchange data content, information, and/or similar terms used herein interchangeably that can be transmitted, received, operated on, processed, displayed, stored, and/or the like.

In some embodiments, data (e.g., audio, video, etc.) may be downloaded by one or more user computing devices to a server such as shown in FIG. 24 when the device accesses a network connection, such as a wireless access point or hotspot. The data transfer may be performed using protocols like file transfer protocol (FTP), MQ telemetry transport (MQTT), advanced message queuing protocol (AMQP), hypertext transfer protocol (HTTP), and HTTP secure (HTTPS). These protocols may be made secure over transport layer security (TLS) and/or secure sockets layer (SSL).

Exemplary Management Computing Entity

FIG. 24 is an exemplary schematic diagram of a management computing entity or server node 2400, such as a task initiator, coordinator cluster, coordinator cluster node, master cluster, master cluster node, a tracker server, or a blockchain node, for implementing the THETA decentralized computing and storage network, according to exemplary embodiments of the present invention. The terms computing entity, computer, entity, device, system, and/or similar words used herein interchangeably are explained in detail with reference to user computing entity 1000.

As indicated, in one embodiment, management computing entity 2400 may include one or more network or communications interface 2420 for communicating with various computing entities, such as by communicating data, content, information, and/or similar terms used herein interchangeably that can be transmitted, received, operated on, processed, displayed, stored, and/or the like. For instance, management computing entity 2400 may communicate with user computing device 1000 and/or a variety of other computing entities. Network or communications interface 2420 may utilize a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 2400 may be configured to communicate via wireless external communication networks using any of a variety of standards and protocols as discussed with reference to user computing device 2300.

As shown in FIG. 24, in one embodiment, management computing entity 2400 may include or be in communication with one or more processing unit 2410 (also referred to as processors, processing circuitry, processing element, and/or similar terms used herein interchangeably) that communicate with other elements within the management computing entity 2400. As will be understood, processing unit 2410 may be embodied in a number of different ways. For example, as one or more CPLDs, microprocessors, multi-core processors, coprocessing entities, ASIPs, microcontrollers, and/or controllers, in the form of integrated circuits, application specific integrated circuits (ASICs), field programmable gate arrays (FPGAs), programmable logic arrays (PLAs), hardware accelerators, other circuitry, and/or the like. As will therefore be understood, processing unit 2410 may be configured for a particular use or configured to execute instructions stored in volatile or non-volatile media 2430 and 2440. As such, whether configured by hardware or computer program products, or by a combination thereof, processing unit 2410 may be capable of performing steps or operations according to embodiments of the present disclosure when configured accordingly.

Although not shown explicitly, management computing entity 2400 may include or be in communication with one or more input elements, such as a keyboard, a mouse, a touch screen/display, a camera for motion and movement input, a mic for audio input, a joystick, and/or the like. Management computing entity 2400 may also include or be in communication with one or more output elements such as speaker, screen/display, and/or the like.

In various embodiments, one or more of the components of management computing entity 2400 may be located remotely from other management computing entity components, such as in a distributed system or in the cloud. Furthermore, one or more of the components may be combined and additional components performing functions described herein may be included in the management computing entity 2400. Thus, the management computing entity 2400 can be adapted to accommodate a variety of needs and circumstances. As will be recognized, these architectures and descriptions are provided for exemplary purposes only and are not limiting to the various embodiments.

Additional Implementation Details

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skills in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g., any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware may also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of streaming content and information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although specific embodiments of the disclosure have been described, one of ordinary skills in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skills in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modifications and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A non-transitory computer-readable storage medium having instructions stored therein, which when executed by a processor, cause a coordinator cluster of a cloud-edge computing platform to execute steps comprising:
   receive, at the coordinator cluster, a data file associated with a workload;
      wherein the workload comprises a first compute task and a second compute task, wherein the data file comprises a first task metadata for the first compute task and a second task metadata for the second compute task;
select, by the coordinator cluster, a first shard in the cloud-edge computing platform based on the first task metadata and a second shard in the cloud-edge computing platform based on the second task metadata,
   wherein the selected first shard is an edge-based network on the cloud-edge computing platform,
   wherein the edge-based network comprises a decentralized blockchain-based network,
   wherein the coordinator cluster comprises a task initiator node of the edge-based network, and
   wherein the selected second shard is a cloud-based network on the cloud-edge computing platform;
compute, by the coordinator cluster, for each of one or more worker nodes in the selected first shard, a first efficiency score, and for each of one or more worker nodes in the selected second shard, a second efficiency score,
   wherein the first efficiency score for the each of the one or more worker nodes in the selected first shard depends at least on the first task metadata and one or more characteristics of the each of the one or more worker nodes in the selected first shard, and
   wherein the second efficiency score for the each of the one or more worker nodes in the selected second shard depends at least on the second task metadata and one or more characteristics of the each of the one or more worker nodes in the selected second shard;
select, by the coordinator cluster, a selected first plurality of worker nodes in the selected first shard to execute the first compute task, based on the first efficiency scores of each of the selected first plurality of worker nodes in the selected first shard,
   wherein the selected first shard comprises a master cluster,
   wherein the master cluster belongs to the first shard and is distinct from the coordinator cluster,
   wherein the master cluster orchestrates the first compute task among the selected first plurality of worker nodes in the selected first shard, and
   wherein the master cluster orchestrates by distributing the first compute task among the selected first plurality of worker nodes in the selected first shard; and
   wherein the selected first plurality of worker nodes in the selected first shard are edge computing nodes in the edge-based network;
select, by the coordinator cluster, a selected second plurality of worker nodes in the selected second shard to execute the second compute task, based on the second efficiency scores of each of the selected second plurality of worker nodes in the selected second shard;
register, by the task initiator node, the first compute task by invoking a smart contract on a blockchain associated with the edge-based network;
route, by the coordinator cluster, the first compute task and at least a first portion of the data file associated with the workload to the selected first shard and the selected first plurality of worker nodes in the selected first shard;
receive, by the coordinator cluster, a first task solution for the first compute task, from the selected first shard and the selected first plurality of worker nodes in the selected first shard;
verify, by the coordinator cluster, the first task solution for the first compute task;
route, by the coordinator cluster, the second compute task, the first task solution, and at least a second portion of the data file associated with the workload to the selected second shard and the selected second plurality of worker nodes in the selected second shard;
receive, by the coordinator cluster, a second task solution for the second compute task, from the selected second shard and the selected second plurality of worker nodes in the selected second shard;
verify, by the coordinator cluster, the second task solution for the second compute task;
invoke, by the task initiator node, the smart contract to transfer a first reward to the selected first plurality of worker nodes in the selected first shard upon successful verification of the first task solution,
   wherein the first reward is from a reward pool on the blockchain; and
transfer, by the coordinator cluster, a second reward to the selected second plurality of worker nodes in the selected second shard upon successful verification of the second task solution.

2. The non-transitory computer-readable storage medium of claim 1, wherein the first task solution is encrypted by the selected first plurality of worker nodes in the selected first shard, wherein a zero-knowledge proof of the first task solution is provided by the selected first plurality of worker nodes in the selected first shard, and wherein the verifying of the first task solution by the coordinator cluster further comprises verifying the zero-knowledge proof of the first task solution.

3. The non-transitory computer-readable storage medium of claim 1, wherein the first reward is calculated by the coordinator cluster based on factors comprising one or more of a job type, a correctness of the first task solution, a first task completion time, and a resource usage of the selected first plurality of worker nodes in the selected first shard.

4. The non-transitory computer-readable storage medium of claim 1, the storage medium further comprising instructions to:
provide feedback, by the coordinator cluster, to a user, wherein the feedback comprises at least one of a workload completion status, a cryptocurrency amount associated with the first reward, an owner of the workload, a status of the workload, and an identifier associated with the workload.

5. The non-transitory computer-readable storage medium of claim 1, wherein the one or more shards in the cloud-edge computing platforms are part of a multi-shard architecture comprising at least one of a community shard with edge worker nodes, a managed shard with managed cloud nodes, and a partner shard with partner-hosted cloud nodes.

6. The non-transitory computer-readable storage medium of claim 1, wherein the first compute task is a generic containerized compute task.

7. The non-transitory computer-readable storage medium of claim 1, wherein the workload comprises an artificial intelligence task.

8. The non-transitory computer-readable storage medium of claim 1, wherein the workload comprises a video processing task.

9. The non-transitory computer-readable storage medium of claim 1, wherein the cloud-edge computing platform comprises a distributed storage component that supports temporal, persistent, and immutable storage use cases.

10. The non-transitory computer-readable storage medium of claim 1, wherein the selected first plurality of worker nodes in the selected first shard accesses data from a distributed vector database in the cloud-edge computing platform to compute the first task solution for the first compute task.

11. The non-transitory computer-readable storage medium of claim 1, wherein first task metadata comprises privacy requirements.

12. The non-transitory computer-readable storage medium of claim 1, wherein one of the first compute task and the second compute task comprises a proprietary model accessible through an application programming interface (API).

13. A method for hybrid cloud-edge computing in a cloud-edge computing platform, the method comprising:
    receiving, at a coordinator cluster of the cloud-edge computing platform, a data file associated with a workload,
        wherein the workload comprises a first compute task and a second compute task,
        wherein the data file comprises a first task metadata for the first compute task and a second task metadata for the second compute task;
    selecting, by the coordinator cluster, a first shard in the cloud-edge computing platform based on the first task metadata and a second shard in the cloud-edge computing platform based on the second task metadata,
        wherein the selected first shard is an edge-based network on the cloud-edge computing platform,
        wherein the edge-based network comprises a decentralized blockchain-based network,
        wherein the coordinator cluster comprises a task initiator node of the edge-based network, and
        wherein the selected second shard is a cloud-based network on the cloud-edge computing platform;
    computing, by the coordinator cluster, for each of one or more worker nodes in the selected first shard, a first efficiency score, and for each of one or more worker nodes in the selected second shard, a second efficiency score,
        wherein the first efficiency score for the each of the one or more worker nodes in the selected first shard depends at least on the first task metadata and one or more characteristics of the each of the one or more worker nodes in the selected first shard, and
        wherein the second efficiency score for the each of the one or more worker nodes in the selected second shard depends at least on the second task metadata and one or more characteristics of the each of the one or more worker nodes in the selected second shard;
    selecting, by the coordinator cluster, a selected first plurality of worker nodes in the selected first shard to execute the first compute task based on the first efficiency scores of each of the selected first plurality of worker nodes in the selected first shard,
        wherein the selected first shard comprises a master cluster,
        wherein the master cluster belongs to the first shard and is distinct from the coordinator cluster,
        wherein the master cluster orchestrates the first compute task among the selected first plurality of worker nodes in the selected first shard,
        wherein the master cluster orchestrates by distributing the first compute task among the selected first plurality of worker nodes in the selected first shard; and
        wherein the selected first plurality of worker nodes in the selected first shard are edge computing nodes in the edge-based network;
    selecting, by the coordinator cluster, a selected second plurality of worker nodes in the selected second shard to execute the second compute task, based on the efficiency scores of each of the selected second plurality of worker nodes in the selected second shard;
    registering, by the task initiator node, the first compute task by invoking a smart contract on a blockchain associated with the edge-based network;
    routing, by the coordinator cluster, the first compute task and at least a first portion of the data file associated with the workload to the selected first shard and the selected first plurality of worker nodes in the selected first shard;
    receiving, by the coordinator cluster, a first task solution for the first compute task, from the selected first shard and the selected first plurality of worker nodes in the selected first shard;
    verifying, by the coordinator cluster, the first task solution for the first compute task,
    routing, by the coordinator cluster, the second compute task, the first task solution, and at least a second portion of the data file associated with the workload to the selected second shard and the selected second plurality of worker nodes in the selected second shard;
    receiving, by the coordinator cluster, a second task solution for the second compute task, from the selected second shard and the selected second plurality of worker nodes in the selected second shard;
    verifying, by the coordinator cluster, the second task solution for the second compute task;
    invoking, by the task initiator node, the smart contract to transfer a first reward to the selected first plurality of worker nodes in the selected first shard upon successful verification of the first task solution,
        wherein the first reward is from a reward pool on the blockchain; and
    transferring, by the coordinator cluster, a second reward to the selected second plurality of worker nodes in the selected second shard upon successful verification of the second task solution.

14. The method of claim 13, wherein the first task solution is encrypted by the selected first plurality of worker nodes in the selected first shard, wherein a zero-knowledge proof of the first task solution is provided by the selected first plurality of worker nodes in the selected first shard, and wherein the verifying of the first task solution by the coordinator cluster further comprises verifying the zero-knowledge proof of the first task solution.

15. The method of claim 13, wherein the first reward is calculated by the coordinator cluster based on factors comprising one or more of a job type, a correctness of the first task solution, a first task completion time, and a resource usage of the selected first plurality of worker nodes in the selected first shard.

16. The method of claim 13, further comprising:
    providing feedback, by the coordinator cluster, to a user, wherein the feedback comprises at least one of a workload completion status, a cryptocurrency amount associated with the first reward, an owner of the workload, a status of the workload, and an identifier associated with the workload.

* * * * *